United States Patent
Elshafie et al.

(10) Patent No.: US 12,206,500 B2
(45) Date of Patent: Jan. 21, 2025

(54) EFFICIENT TURBO HYBRID AUTOMATIC REPEAT REQUEST FEEDBACK REPORTING

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/364,563

(22) Filed: Jun. 30, 2021

(65) Prior Publication Data

US 2022/0014313 A1 Jan. 13, 2022

Related U.S. Application Data

(60) Provisional application No. 63/048,987, filed on Jul. 7, 2020.

(51) Int. Cl.
| | |
|---|---|
| *H04L 1/1607* | (2023.01) |
| *H04L 5/00* | (2006.01) |
| *H04W 72/0446* | (2023.01) |
| *H04W 72/51* | (2023.01) |
| *H04W 88/06* | (2009.01) |

(52) U.S. Cl.
CPC ......... *H04L 1/1671* (2013.01); *H04L 5/0051* (2013.01); *H04W 72/0446* (2013.01); *H04W 72/51* (2023.01); *H04W 88/06* (2013.01)

(58) Field of Classification Search
CPC ... H04L 1/1671; H04L 5/0051; H04L 1/0003; H04L 1/0009; H04L 1/0026; H04L 1/0031; H04L 1/1825; H04L 1/1864; H04L 5/001; H04L 5/0091; H04L 5/0057; H04L 5/0055; H04W 72/0446; H04W 72/048; H04W 88/06; H04W 8/24; H04W 24/02
See application file for complete search history.

(56) References Cited

U.S. PATENT DOCUMENTS

| | | | |
|---|---|---|---|
| 10,470,168 B2* | 11/2019 | Lv | H04B 7/0639 |
| 2012/0307733 A1* | 12/2012 | Kim | H04L 1/1854 |
| | | | 370/328 |
| 2014/0064218 A1* | 3/2014 | Kim | H04L 5/0053 |
| | | | 370/329 |
| 2018/0014301 A1 | 1/2018 | Chen et al. | |
| 2020/0076562 A1* | 3/2020 | Loehr | H04W 72/042 |

(Continued)

*Primary Examiner* — Nishant Divecha
(74) *Attorney, Agent, or Firm* — Holland & Hart LLP

(57) ABSTRACT

Methods, systems, and devices for wireless communications are described. A user equipment (UE) may transmit, to a base station, a UE capability associated with reference signal reporting by the UE. The UE may receive, from the base station, a data packet and an indication of a mode for hybrid automatic repeat request (HARQ) feedback reporting based on the UE capability. The UE may determine that a slot includes first resources for transmitting a sounding reference signal (SRS) and second resources for transmitting HARQ feedback for the data packet. The UE may transmit, to the base station during the slot and based on the indication of the mode for HARQ feedback reporting, the HARQ feedback and one or more of the SRS or CSI associated with the HARQ feedback.

27 Claims, 18 Drawing Sheets

(56) References Cited

U.S. PATENT DOCUMENTS

2020/0404525 A1* 12/2020 Rahman ................ H04L 5/0091
2022/0104208 A1*  3/2022 Chen ..................... H04W 72/02
2022/0360363 A1* 11/2022 Lin ....................... H04L 1/0016

* cited by examiner

EFFICIENT TURBO HYBRID AUTOMATIC REPEAT REQUEST FEEDBACK REPORTING

CROSS REFERENCE

The present application for patent claims the benefit of U.S. Provisional Patent Application No. 63/048,987 by ELSHAFIE et al., entitled "EFFICIENT TURBO HYBRID AUTOMATIC REPEAT REQUEST FEEDBACK REPORTING," filed Jul. 7, 2020, assigned to the assignee hereof, and expressly incorporated by reference herein.

FIELD OF TECHNOLOGY

The following relates generally to wireless communications and more specifically to efficient turbo hybrid automatic repeat request feedback reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support efficient feedback reporting, such as efficient turbo hybrid automatic repeat request (HARQ) feedback reporting. Generally, the described techniques provide for various modes for feedback reporting, such as HARQ feedback reporting, when a user equipment (UE) is scheduled to report feedback, such as HARQ feedback with channel state information (CSI) and a sounding reference signal (SRS), which may in some examples occur in a same slot. Transmitting both SRS and HARQ feedback with CSI may be complex and consume significant power at the UE when the UE is scheduled for both, for example, in the same slot. A wireless communications system described herein may implement techniques to reduce the complexity and the power consumption at a UE while supporting transmitting feedback, such as HARQ feedback with CSI reporting. For example, based on a capability of the UE, the UE may be configured to send different information (based on one or more factors) in a slot where the UE is scheduled to send SRS and HARQ feedback with CSI. For example, the UE may send SRS or CSI, or both, based on various factors, such as the UE capability.

The UE may indicate a UE capability, which may be a UE capability associated with reference signal reporting, including available power and processing capabilities, to a base station. The base station may, based on the indication of the UE capability, indicate a mode (e.g., a first mode, a second mode, a third mode) for the UE to use to send feedback. In a first mode, the UE may send an SRS signal and HARQ feedback, and the UE may not send (e.g., report) CSI with the HARQ feedback. In a second mode, the UE may send (e.g., report) CSI with the HARQ feedback and not send an SRS. In a third mode, the UE may send SRS and send (e.g., report) CSI with HARQ feedback. A base station may, in some examples, send signaling via radio resource control (RRC) or a medium access control (MAC) control element (CE) to indicate a mode to the UE, and the mode may be dynamically updated, for example, via downlink control information.

A method of wireless communications at a UE is described. The method may include transmitting, to a base station, a UE capability associated with reference signal reporting by the UE, receiving, from the base station, a data packet and an indication of a mode for the reference signal reporting based on the UE capability, determining that a slot includes first resources for transmitting an SRS and second resources for transmitting HARQ feedback for the data packet, and transmitting, to the base station during the slot and based on the indication of the mode for the reference signal reporting, the HARQ feedback and one or more of the SRS or CSI associated with the HARQ feedback.

An apparatus for wireless communications at a UE is described. The apparatus may include a processor, memory coupled with the processor, and instructions stored in the memory. The instructions may be executable by the processor to cause the apparatus to transmit, to a base station, a UE capability associated with reference signal reporting by the UE, receive, from the base station, a data packet and an indication of a mode for the reference signal reporting based on the UE capability, determine that a slot includes first resources for transmitting an SRS and second resources for transmitting HARQ feedback for the data packet, and transmit, to the base station during the slot and based on the indication of the mode for the reference signal reporting, the HARQ feedback and one or more of the SRS or CSI associated with the HARQ feedback.

Another apparatus for wireless communications at a UE is described. The apparatus may include means for transmitting, to a base station, a UE capability associated with reference signal reporting by the UE, receiving, from the base station, a data packet and an indication of a mode for the reference signal reporting based on the UE capability, determining that a slot includes first resources for transmitting an SRS and second resources for transmitting HARQ feedback for the data packet, and transmitting, to the base station during the slot and based on the indication of the mode for the reference signal reporting, the HARQ feedback and one or more of the SRS or CSI associated with the HARQ feedback.

A non-transitory computer-readable medium storing code for wireless communications at a UE is described. The code may include instructions executable by a processor to transmit, to a base station, a UE capability associated with reference signal reporting by the UE, receive, from the base station, a data packet and an indication of a mode for the reference signal reporting based on the UE capability, determine that a slot includes first resources for transmitting an SRS and second resources for transmitting HARQ feedback for the data packet, and transmit, to the base station during the slot and based on the indication of the mode for the reference signal reporting, the HARQ feedback and one or more of the SRS or CSI associated with the HARQ feedback.

Some examples of the method, apparatuses, and non-transitory computer-readable medium described herein may further include operations, features, means, or instructions for determining that the mode for the reference signal reporting configures the UE to transmit the HARQ feedback and the SRS, where transmitting the HARQ feedback and one or more of the SRS or the CSI associated with the HARQ feedback may be based on the determining.

Some examples of the method, apparatuses, and non-transitory computer-readable medium described herein may further include operations, features, means, or instructions for determining that the mode for the reference signal reporting configures the UE to transmit the HARQ feedback and the CSI associated with the HARQ feedback, where transmitting the HARQ feedback and one or more of the SRS or the CSI associated with the HARQ feedback may be based on the determining.

Some examples of the method, apparatuses, and non-transitory computer-readable medium described herein may further include operations, features, means, or instructions for determining that the mode for the reference signal reporting configures the UE to transmit the HARQ feedback, the CSI associated with the HARQ feedback, and the SRS, where transmitting the HARQ feedback and one or more of the SRS or the CSI associated with the HARQ feedback may be based on the determining.

In some examples of the method, apparatuses, and non-transitory computer-readable medium described herein, receiving the indication of the mode for the reference signal reporting may include operations, features, means, or instructions for receiving RRC signaling or a MAC CE including the indication of the mode for the reference signal reporting.

In some examples of the method, apparatuses, and non-transitory computer-readable medium described herein, receiving the indication of the mode for the reference signal reporting may include operations, features, means, or instructions for receiving downlink control information including the indication of the mode for the reference signal reporting.

In some examples of the method, apparatuses, and non-transitory computer-readable medium described herein, transmitting the UE capability may include operations, features, means, or instructions for transmitting the UE capability via uplink control information, a MAC CE, or both.

Some examples of the method, apparatuses, and non-transitory computer-readable medium described herein may further include operations, features, means, or instructions for transmitting an updated UE capability based on a change to a power availability at the UE, a change to a processing capability at the UE, a change to one or more channel conditions, or any combination thereof, where the indication of the mode for the reference signal reporting may be based on the updated UE capability.

In some examples of the method, apparatuses, and non-transitory computer-readable medium described herein, the UE capability for reference signal reporting may be based on one or more of battery status, processing capability, modem capability, and channel conditions.

Some examples of the method, apparatuses, and non-transitory computer-readable medium described herein may further include operations, features, means, or instructions for receiving a second indication of an updated mode for the HARQ feedback reporting from the base station, where transmitting the HARQ feedback and one or more of the SRS or the CSI associated with the HARQ feedback may be based on the updated mode for the HARQ feedback reporting.

Some examples of the method, apparatuses, and non-transitory computer-readable medium described herein may further include operations, features, means, or instructions for determining a set of component carriers may be configured for the UE, and determining, based on the indication of the mode for the reference signal reporting, a corresponding mode for each component carrier of the set of component carriers, where transmitting the HARQ feedback and one or more of the SRS or the CSI associated with the HARQ feedback on each component carrier of the set of component carriers may be based on the corresponding mode.

In some examples of the method, apparatuses, and non-transitory computer-readable medium described herein, the UE capability may be based on one or more channel conditions for each component carrier of the set of component carriers.

In some examples of the method, apparatuses, and non-transitory computer-readable medium described herein, a first mode corresponds to a first component carrier of the set of component carriers, and a second mode corresponds to a second component carrier of the set of component carriers, where the first mode and the second mode may be different.

Some examples of the method, apparatuses, and non-transitory computer-readable medium described herein may further include operations, features, means, or instructions for determining that the UE cannot meet a timeline for calculating the CSI associated with the HARQ feedback, where the transmitting includes transmitting the HARQ feedback and the SRS based on determining that the UE cannot meet the timeline.

Some examples of the method, apparatuses, and non-transitory computer-readable medium described herein may further include operations, features, means, or instructions for monitoring for a retransmission of the data packet from the base station based on transmitting the HARQ feedback and one or more of the SRS or the CSI associated with the HARQ feedback.

In some examples of the method, apparatuses, and non-transitory computer-readable medium described herein, the indication includes a bitmap, where each bit of the bitmap corresponds to a different mode for the reference signal reporting supported by the UE.

A method of wireless communications at a base station is described. The method may include receiving, from a UE, a UE capability associated with reference signal reporting by the UE, selecting a mode for the UE for the reference signal reporting based on the UE capability, transmitting, to the UE, a data packet and an indication of the mode for the reference signal reporting, scheduling the UE with first resources for HARQ feedback of the data packet in a slot including second resources for transmitting an SRS, and receiving, from the UE during the slot and based on the mode for the reference signal reporting, the HARQ feedback and one or more of the SRS or CSI associated with the HARQ feedback.

An apparatus for wireless communications at a base station is described. The apparatus may include a processor, memory coupled with the processor, and instructions stored in the memory. The instructions may be executable by the processor to cause the apparatus to receive, from a UE, a UE capability associated with reference signal reporting by the UE, select a mode for the UE for the reference signal reporting based on the UE capability, transmit, to the UE, a data packet and an indication of the mode for the reference signal reporting, schedule the UE with first resources for HARQ feedback of the data packet in a slot including second resources for transmitting an SRS, and receive, from the UE during the slot and based on the mode for the reference signal reporting, the HARQ feedback and one or more of the SRS or CSI associated with the HARQ feedback.

Another apparatus for wireless communications at a base station is described. The apparatus may include means for receiving, from a UE, a UE capability associated with reference signal reporting by the UE, selecting a mode for the UE for the reference signal reporting based on the UE capability, transmitting, to the UE, a data packet and an indication of the mode for the reference signal reporting, scheduling the UE with first resources for HARQ feedback of the data packet in a slot including second resources for transmitting an SRS, and receiving, from the UE during the slot and based on the mode for the reference signal reporting, the HARQ feedback and one or more of the SRS or CSI associated with the HARQ feedback.

A non-transitory computer-readable medium storing code for wireless communications at a base station is described. The code may include instructions executable by a processor to receive, from a UE, a UE capability associated with reference signal reporting by the UE, select a mode for the UE for the reference signal reporting based on the UE capability, transmit, to the UE, a data packet and an indication of the mode for the reference signal reporting, schedule the UE with first resources for HARQ feedback of the data packet in a slot including second resources for transmitting an SRS, and receive, from the UE during the slot and based on the mode for the reference signal reporting, the HARQ feedback and one or more of the SRS or CSI associated with the HARQ feedback.

In some examples of the method, apparatuses, and non-transitory computer-readable medium described herein, selecting the mode for the UE for the HARQ feedback reporting may include operations, features, means, or instructions for selecting the mode for the reference signal reporting to configure the UE to transmit the HARQ feedback and the SRS.

In some examples of the method, apparatuses, and non-transitory computer-readable medium described herein, selecting the mode for the UE for the HARQ feedback reporting may include operations, features, means, or instructions for selecting the mode for the reference signal reporting to configure the UE to transmit the HARQ feedback and the CSI associated with the HARQ feedback.

In some examples of the method, apparatuses, and non-transitory computer-readable medium described herein, selecting the mode for the UE for the HARQ feedback reporting may include operations, features, means, or instructions for selecting the mode for the reference signal reporting to configure the UE to transmit the HARQ feedback, the CSI associated with the HARQ feedback, and the SRS.

In some examples of the method, apparatuses, and non-transitory computer-readable medium described herein, transmitting the indication of the mode for the reference signal reporting may include operations, features, means, or instructions for transmitting RRC signaling or a MAC CE including the indication of the mode for the reference signal reporting.

In some examples of the method, apparatuses, and non-transitory computer-readable medium described herein, transmitting the indication of the mode for the reference signal reporting may include operations, features, means, or instructions for transmitting downlink control information including the indication of the mode for the reference signal reporting.

In some examples of the method, apparatuses, and non-transitory computer-readable medium described herein, receiving the UE capability may include operations, features, means, or instructions for receiving the UE capability via uplink control information, a MAC CE, or both.

Some examples of the method, apparatuses, and non-transitory computer-readable medium described herein may further include operations, features, means, or instructions for receiving an updated UE capability based on a change to a power availability at the UE, a change to a processing capability at the UE, a change to one or more channel conditions, or any combination thereof, where selecting the mode for the reference signal reporting may be based on the updated UE capability.

Some examples of the method, apparatuses, and non-transitory computer-readable medium described herein may further include operations, features, means, or instructions for transmitting a second indication of an updated mode for the HARQ feedback reporting to the UE.

Some examples of the method, apparatuses, and non-transitory computer-readable medium described herein may further include operations, features, means, or instructions for determining a set of component carriers may be configured for the UE, where selecting the mode for the UE for the HARQ feedback reporting includes selecting a corresponding mode for each component carrier of the set of component carriers, where the indication of the mode for the reference signal reporting indicates the corresponding mode for the reference signal reporting for each component carrier of the set of component carriers.

In some examples of the method, apparatuses, and non-transitory computer-readable medium described herein, the UE capability may be based on channel conditions for each component carrier of the set of component carriers.

In some examples of the method, apparatuses, and non-transitory computer-readable medium described herein, a first mode corresponds to a first component carrier of the set of component carriers, and a second mode corresponds to a second component carrier of the set of component carriers, where the first mode and the second mode may be different.

Some examples of the method, apparatuses, and non-transitory computer-readable medium described herein may further include operations, features, means, or instructions for determining that the base station cannot process the SRS, where the mode for the reference signal reporting configures the UE to transmit the HARQ feedback and the CSI associated with the HARQ feedback based on the determining.

Some examples of the method, apparatuses, and non-transitory computer-readable medium described herein may further include operations, features, means, or instructions for retransmitting the data packet to the UE based on the HARQ feedback.

Some examples of the method, apparatuses, and non-transitory computer-readable medium described herein may further include operations, features, means, or instructions for determining a modulation and coding scheme for retransmitting the data packet, a resource for retransmitting the data packet, or both, based on receiving the CSI associated with the HARQ feedback, where retransmitting the data may be based on determining the modulation and coding scheme for retransmitting the data packet, the resource for retransmitting the data packet, or both.

Some examples of the method, apparatuses, and non-transitory computer-readable medium described herein may further include operations, features, means, or instructions for determining a precoding beam for communications with the UE based on receiving the SRS.

Some examples of the method, apparatuses, and non-transitory computer-readable medium described herein may further include operations, features, means, or instructions for determining one or more of a precoding matrix index, a channel quality index, a channel rank, and a retransmission configuration based on receiving the SRS, where the mode for the reference signal reporting configures the UE to transmit the HARQ feedback and the SRS.

In some examples of the method, apparatuses, and non-transitory computer-readable medium described herein, the mode for the reference signal reporting configures the UE to transmit the HARQ feedback and the SRS based on a cell loading of the base station, a retransmission frequency of the UE, or a CSI processing capability of the UE.

Some examples of the method, apparatuses, and non-transitory computer-readable medium described herein may further include operations, features, means, or instructions for selecting a second mode for a second UE for the reference signal reporting based on a second UE capability, where the second mode may be different from the first mode, and transmitting, to the second UE, a second indication of the second mode for the reference signal reporting.

DETAILED DESCRIPTION

Figure 1:
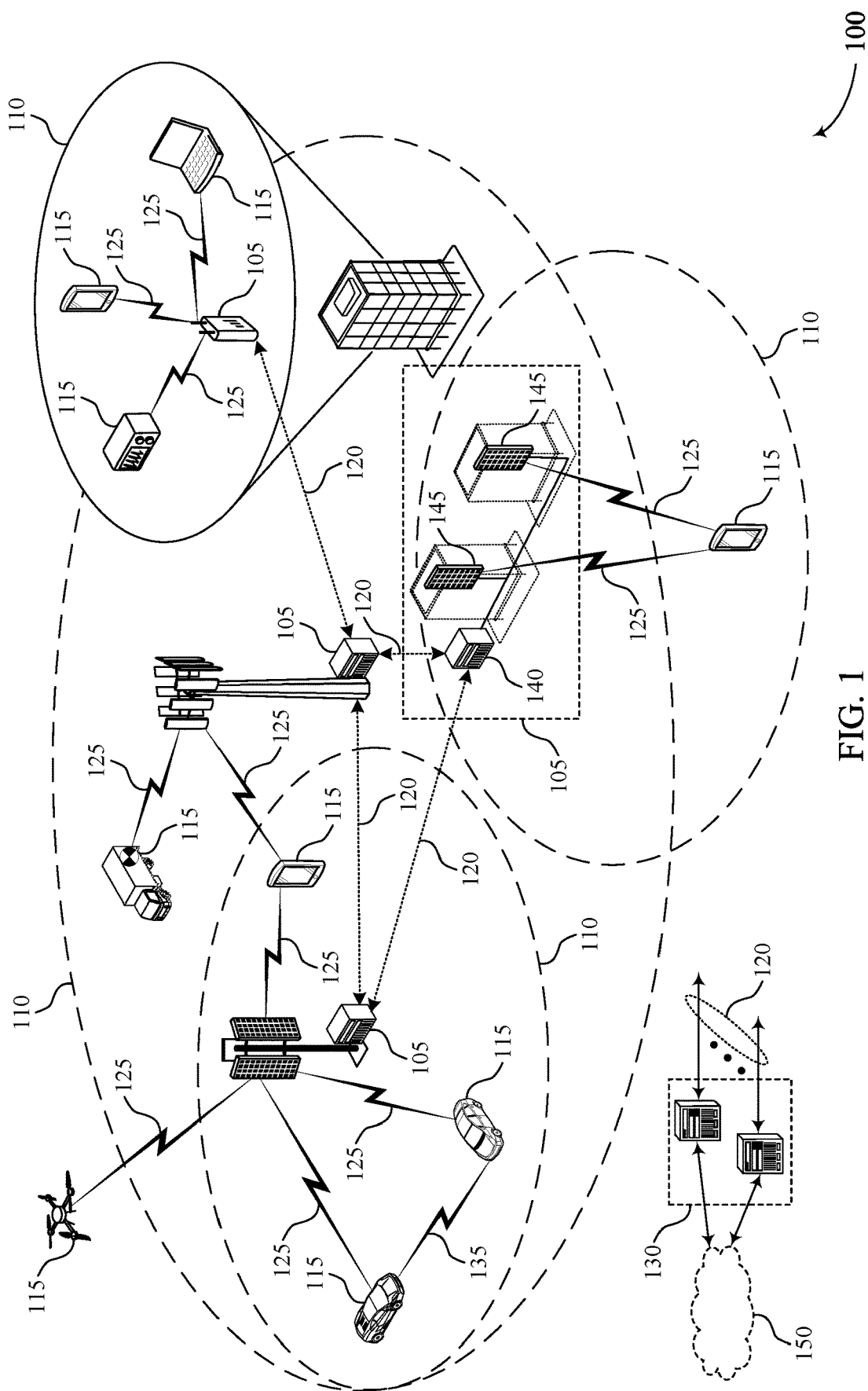
FIG. 1 illustrates an example of a system for wireless communications that supports efficient turbo hybrid automatic repeat request (HARQ) feedback reporting in accordance with aspects of the present disclosure.

Some wireless communications networks may use enhanced feedback techniques to support, for example, ultra-reliable communications with low latency. For example, a user equipment (UE) may fail to decode a portion of a data packet and may send channel state information (CSI) with hybrid automatic repeat request (HARQ) acknowledgment (ACK) feedback to ensure a reliable retransmission. In some cases, by providing CSI with the HARQ ACK feedback, the base station may select a modulation and coding scheme (MCS) (e.g., including a coding length) and resources to ensure an ultra-reliable retransmission. In some cases, lower latency may be achieved by using a single more-reliable, or ultra-reliable, retransmission. In some cases, the technique of providing CSI with HARQ ACK feedback may be referred to as turbo HARQ feedback. CSI computation, which captures interference at the UE, may be exhaustive and may require more significant computational power at the UE and may be scheduled to be transmitted under a tight timeline. For example, the UE may have just a few symbol periods to calculate and report the CSI after receiving a data packet. In some cases, the UE may be scheduled to send a sounding reference signal (SRS) in the same slot as CSI and HARQ ACK feedback. SRS transmission may be power consuming, however, and an SRS antenna switch to perform the SRS transmission may cause some insertion loss. An SRS may be used by the base station to estimate the uplink channel. However, some of the channel information indicated by an SRS may also be indicated by the CSI, so reporting SRS and CSI may, in some cases, have some redundancy. Transmitting both SRS and HARQ ACK feedback with CSI may be very complex and consume significant power at the UE when the UE is scheduled for both, for example, in the same slot.

A wireless communications system described herein may implement techniques to reduce complexity and power consumption at a UE while supporting turbo HARQ feedback reporting. For example, based on one or more factors, such as a capability of the UE, the UE may be configured to send different information in a slot where the UE is scheduled to send SRS and HARQ feedback with CSI. For example, the UE may send SRS, or CSI, or both, based on the UE capability. These techniques may reduce the processing and timing strain of turbo HARQ feedback reporting based on the UE capability. The UE may indicate a UE capability associated with reference signal reporting, including available power and processing capabilities, to a base station. The base station may determine and then indicate, to the UE, one or more modes (e.g., a first mode, a second mode, a third mode) for the UE to use to send feedback based on the UE capability. In a first mode, the UE may send an SRS signal, and the UE may not send (e.g., report) CSI with the HARQ feedback. In some examples of the first mode, the UE may transmit the SRS signal and HARQ feedback without the CSI report. In a second mode, the UE may send (e.g., report) CSI with the HARQ feedback and may not send an SRS. In a third mode, the UE may send SRS and send (e.g., report) CSI with HARQ feedback. In some cases, the third mode may be utilized by very capable UEs which can handle the large power consumption and complexity of sending SRS and CSI with HARQ feedback. A base station may send signaling, such as the indication of the one or more modes, via radio resource control (RRC) or a medium access control (MAC) control element (CE) to indicate the one or more modes to the UE. In some cases, the one or more modes of the UE may be dynamically updated, for example, via downlink control information. In some cases, the UE may be configured with multiple component carriers, and the UE may be configured with a respective mode for each of the component carriers. Additional support for and examples of these techniques are described herein.

Aspects of the disclosure are initially described in the context of wireless communications systems. Aspects of the disclosure are further illustrated by and described with reference to apparatus diagrams, system diagrams, and flowcharts that relate to efficient turbo HARQ feedback reporting.

FIG. 1 illustrates an example of a wireless communications system 100 that supports efficient turbo HARQ feedback reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, ultra-reliable low latency communications (URLLC), communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for various modes for HARQ feedback reporting when a UE 115 is scheduled to report HARQ feedback with CSI and an SRS in a same slot. Transmitting both SRS and HARQ feedback with CSI may be very complex and consume significant power at the UE 115 when the UE 115 is scheduled for both in the same slot. The wireless communications system 100 described herein may implement techniques to reduce complexity and power consumption at a UE 115 while supporting HARQ feedback with CSI reporting. For example, based on a capability of the UE 115, the UE 115 may be configured to send different information in a slot where the UE 115 is scheduled to send SRS and HARQ feedback with CSI. For example, the UE 115 may send SRS or CSI, or both, based on the UE capability. The UE 115 may indicate a UE capability associated with reference signal reporting, including available power and processing capabilities, to a base station.

The base station 105 may indicate a mode for the UE 115 to use for reference signal reporting based on the UE capability. The UE 115 may send signaling according to the mode when the UE 115 is scheduled for CSI and SRS in a same time slot (e.g., a same scheduled resource set or same slot). In some examples, a mode for feedback reporting (e.g., HARQ feedback reporting) may be an example of the mode for the reference signal reporting. In a first mode, the UE 115 may send an SRS signal and HARQ feedback, and the UE 115 may not report CSI with the HARQ feedback. In a second mode, the UE 115 may report CSI with the HARQ feedback and not transmit an SRS. In a third mode, the UE 115 may send SRS and report CSI with HARQ feedback. A base station 105 may send signaling via RRC or a MAC CE to indicate a mode to the UE 115, and the mode may be dynamically updated via downlink control information.

Figure 2:
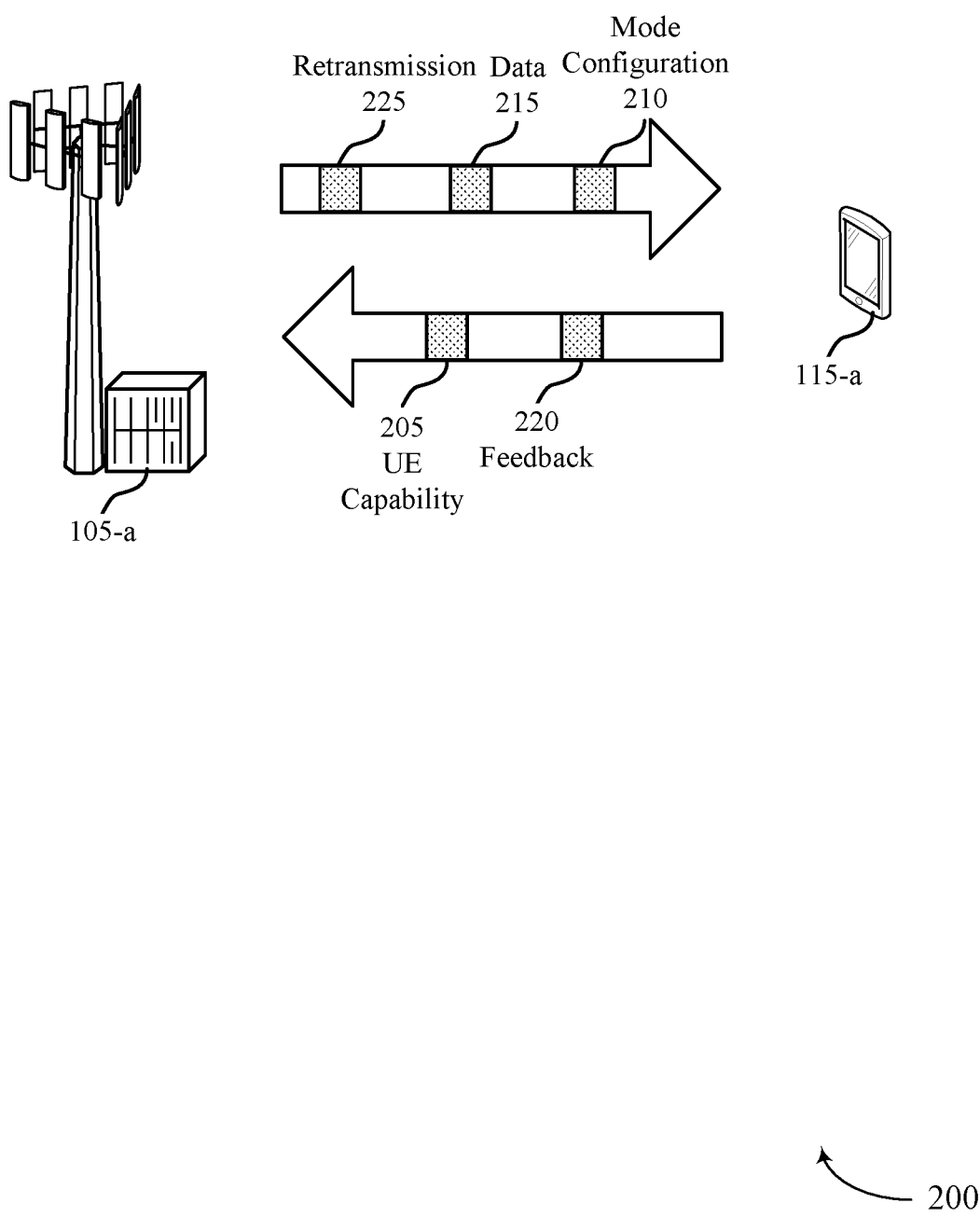
FIG. 2 illustrates an example of a wireless communications system that supports efficient turbo HARQ feedback reporting in accordance with aspects of the present disclosure.

FIG. 2 illustrates an example of a wireless communications system 200 that supports efficient turbo HARQ feedback reporting in accordance with aspects of the present disclosure. In some examples, wireless communications system 200 may implement aspects of wireless communications system 100. The wireless communications system 200 includes UE 115-a and base station 105-a, which may be respective examples of a UE 115 and a base station 105.

The wireless communications system 200 may use enhanced feedback techniques to support communications, such as ultra-reliable communications with low latency, such as URLLC. For example, base station 105-a may transmit data packets 215 to UE 115-a, and UE 115-a may fail to decode at least a apportion of the data packets 215. UE 115-a may determine CSI based on the data packets and report the CSI with feedback 220 (e.g., HARQ feedback) to base station 105-a. Base station 105-a may determine an MCS based on the CSI to perform a retransmission 225 of the data packets 215. In some cases, base station 105-a may select resources for the retransmission 225 based on the CSI. In some cases, lower latency may be achieved by using a single more-reliable, or ultra-reliable, retransmission. In some cases, the technique of providing CSI with HARQ ACK feedback may be referred to as turbo HARQ feedback.

CSI computation, which captures interference at UE 115-a, may be exhaustive and require significant computational power by UE 115-a. UE 115-a may calculate an accumulated capacity based on received signal to interference plus noise ratio (SINR) of the data packets 215. Therefore, the CSI computations may consume a lot of energy at UE 115-a. Additionally, CSI may be transmitted with a tight timeline. For example, UE 115-a may, in some cases, have just a few symbol periods to calculate and report the CSI on resources allocated for the feedback 220 after receiving the data packets 215.

In some cases, UE 115-a may be scheduled to send an SRS in a same slot as CSI and HARQ ACK feedback. SRS transmission may be power consuming, however, and an SRS antenna switch to perform the SRS transmission may cause some insertion loss. SRS may be used by base station 105-a to estimate the uplink channel. However, some of the channel information indicated by an SRS may also be indicated by the CSI, so reporting SRS and CSI may, in some cases, have some redundancy. Transmitting both SRS and HARQ ACK feedback with CSI may be complex and consume significant power at UE 115-a when UE 115-a is scheduled for both in the same slot. Some example slots where a UE 115 is scheduled for both SRS transmission and HARQ ACK feedback with CSI are described with reference to FIG. 4.

The wireless communications system 200 may implement techniques to reduce complexity and power consumption, among other advantages, at a UE 115 such as UE 115-a while supporting turbo HARQ feedback reporting. For example, based on a capability of UE 115-a, UE 115-a may be configured to send different information in a slot where UE 115-a is scheduled to send SRS and HARQ feedback with CSI. For example, UE 115-a may send SRS or CSI, or both, based on the UE capability. These techniques may reduce the processing and timing strain of turbo HARQ feedback reporting based on the UE capability.

UE 115-a may transmit an indication of a UE capability 205 associated with reference signal reporting to base station 105-a. The UE capability 205 may be based on available power (e.g., a battery status) and modem capabilities of UE 115-a. For example, UE 115-a may be configured to report different information based on whether UE 115-a has a high battery level or a low battery level. UE 115-a may send the UE capability 205 to base station 105-a via uplink control information, a MAC CE, or both. In some cases, UE 115-a may send updated UE capabilities based on any changes to the UE capability. For example, if a battery level, processing load, processing power, channel conditions, or any combination thereof, changes for UE 115-a, UE 115-a may send an updated UE capability to base station 105-a. In some cases, the UE capability may include a bitmap, and UE 115-a may indicate which modes UE 115-a can support according to bits in the bitmap. In some cases, UE 115-a may indicate support for multiple modes.

There may be multiple modes (e.g., a first mode, a second mode, a third mode) for feedback reporting when a UE 115 is scheduled for feedback reporting and SRS in the same slot, and the UE 115 may send information in the slot based on one or more selected or enabled modes.

For example, in a first mode, UE 115-a may send an SRS signal, and UE 115-a may not report CSI with the HARQ feedback. The first mode may enable base station 105-a to determine new precoding beams to use when communicating with UE 115-a. In some cases, base station 105-a may determine a PMI, channel quality index (CQI), and channel rank instead of UE 115-a. This may reduce processing strain and usage at UE 115-a. If there are too many UEs 115 served by base station 105-a, then base station 105-a may not adopt the first mode, as it may significantly increase processing power usage at base station 105-a. In some cases, base station 105-a may determine which UEs 115 are configured with the first mode based on a retransmission frequency of the UEs 115 or respective initial mode capabilities reported by the UEs 115. In some cases, the first mode may reduce power consumption at UE 115-a, as UE 115-a may not compute CSI parameters. Additionally, or alternatively, UE 115-a may not have as tight of a reporting timeline, as UE 115-a may refrain from calculating CSI before the deadline (e.g., the uplink control channel resources assigned for reporting the feedback 220). In some cases, a UE 115 may use the first mode if the UE 115 cannot meet the CSI computing timeline. In some examples, UE 115-a may report HARQ feedback when transmitting the SRS. For example, UE 115-a may transmit an SRS and report HARQ ACK feedback, but UE 115-a may not report turbo HARQ feedback (e.g., CSI with HARQ ACK feedback).

In a second mode, UE 115-a may report CSI with the feedback 220 and not transmit an SRS. For example, UE 115-a may not transmit the SRS and therefore not perform the SRS antenna switching, which may prevent insertion loss. UE 115-a may reduce power consumption by not transmitting the SRS. In some cases, UE 115-a may determine the CSI parameters while operating according to the second mode. For example, UE 115-a may determine the PMI, CSI, and channel rank. In some cases, the second mode may be used if base station 105-a is serving multiple UEs 115, and base station 105-a does not have the processing overhead to process SRS from the multiple UEs 115. In some examples, UE 115-a may report turbo HARQ feedback and not transmit an SRS for the second mode.

In a third mode, UE 115-a may send SRS and report CSI with HARQ feedback. In some cases, the third mode may be utilized by very capable UEs 115 which can handle the large power consumption and complexity. In some cases, the third mode may be used for a full resolution and computation of beams by using both base station-side information (e.g., determined based on the SRS) and UE-side information (e.g., the CSI parameters). In some cases, the third mode may be used if UE 115-a is capable and has enough power or energy (e.g., in a battery of UE 115-a) to perform both tasks. For example, UE 115-a may determine if the battery level satisfies a threshold, or the battery information may be conveyed by the UE capability 205. In some examples, UE 115-a may transmit an SRS and report turbo HARQ feedback for the third mode.

Base station 105-a may indicate a mode for UE 115-a to use based on the UE capability. For example, base station 105-a may configure UE 115-a to transmit SRS but not CSI for HARQ feedback, CSI for HARQ feedback but not SRS, or both SRS and CSI for HARQ. In some cases, base station 105-a may send signaling via RRC or a MAC CE to indicate a mode to UE 115-a. In some examples, base station 105-a may indicate an updated mode to UE 115-a. For example, base station 105-a may update the mode via downlink control information. Base station 105-a may indicate an updated mode periodically, semi-periodically, or dynamically. In some cases, base station 105-a may send an indication of an updated mode based on receiving an indication of an updated UE capability. For example, as a battery level changes at UE 115-a, the configured mode for UE 115-a may be changed. As another example, as a cell loading of base station 105-a changes, the mode for UE 115-a may be changed.

In some cases, UE 115-a may be configured with multiple component carriers. UE 115-a may be configured with a mode per-component carrier. For example, UE 115-a may use a first mode for a first component carrier and a second mode for a second component carrier. In some cases, the first mode and the second mode may be the same, or the first mode and the second mode may be different. In some cases, UE 115-a may determine, or decide, if modes are determined per component carrier or if the same mode is applied to all configured component carriers. In some cases, base station 105-a may transmit an indication for a mode for one or more component carriers configured for UE 115-a.

Figure 3:
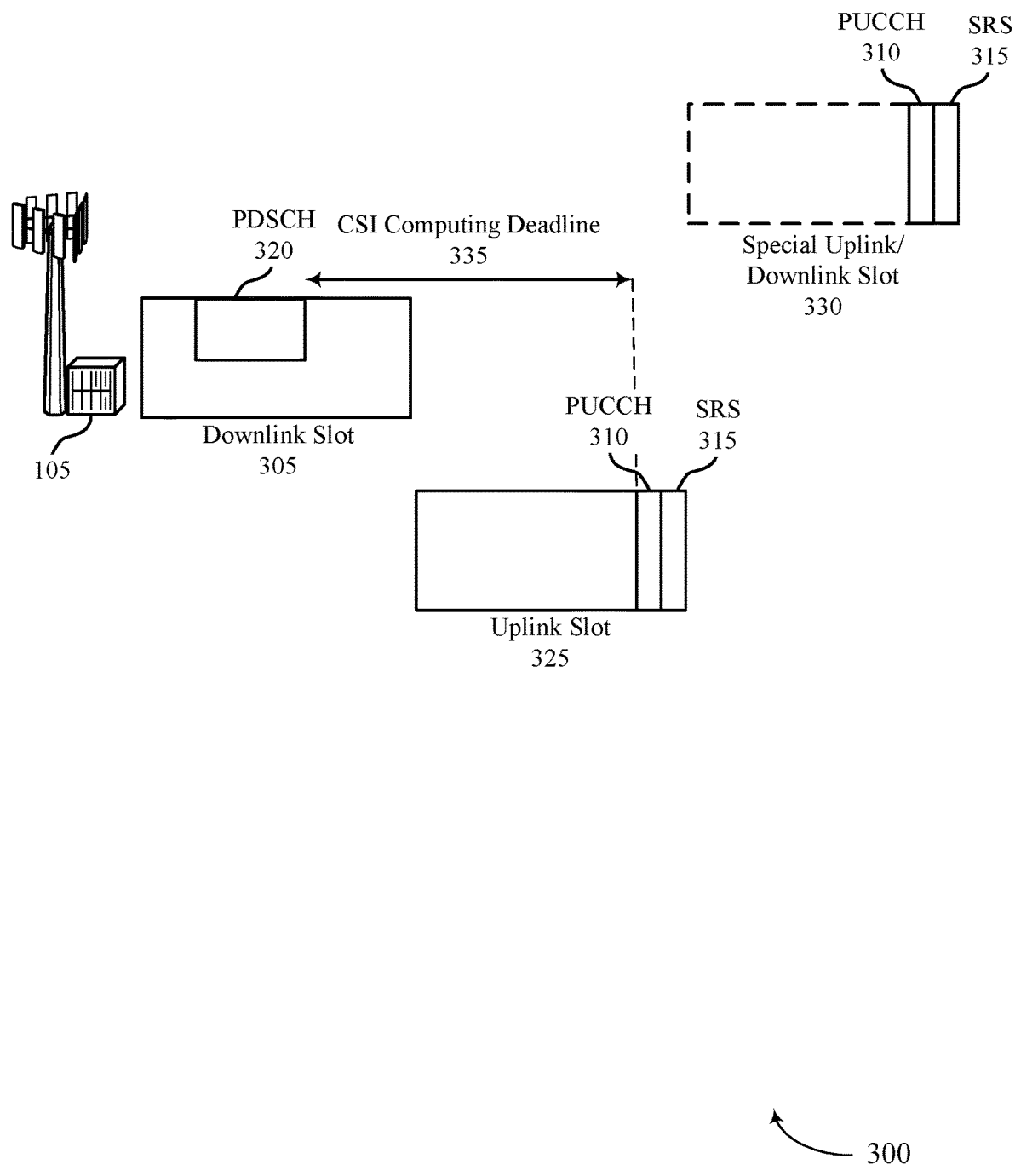
FIG. 3 illustrates an example of slot configurations that support efficient turbo HARQ feedback reporting in accordance with aspects of the present disclosure.

FIG. 3 illustrates an example of slot configurations 300 that supports efficient turbo HARQ feedback reporting in accordance with aspects of the present disclosure. In some examples, the slot configurations 300 may implement aspects of wireless communications system 100.

As described with reference to FIG. 2, a UE 115 may be configured with modes for turbo HARQ feedback reporting when the UE 115 is scheduled to report CSI with HARQ feedback and SRS in a same time slot. In a first mode, the UE 115 may send the SRS, but the UE 115 may not report CSI. For example, the UE 115 may send the SRS with HARQ feedback and refrain from reporting CSI with the HARQ feedback. In a second mode, the UE 115 may report CSI with HARQ feedback and not send the SRS. In a third mode, the UE 115 may both transmit an SRS and report CSI with HARQ feedback.

A base station 105 may transmit data to the UE 115 in a downlink slot 305 on a downlink shared channel 320. The UE 115 may attempt to decode the data and detect a decoding error. The UE 115 may be allocated resources on an uplink control channel 310 which are in a same uplink slot 325 as an SRS resource 315. The UE 115 may transmit the HARQ feedback on the uplink control channel 310 and, based on the configured mode, transmit the CSI on the uplink control channel 310 or the SRS on the SRS resource 315, or both. In some cases, the mode may be based on a CSI computing deadline 335 between the data packet on the downlink shared channel 320 and the uplink resource of the uplink control channel 310. For example, if the UE 115 cannot compute the CSI by the end of the CSI computing deadline 335, the UE 115 may not report the CSI and instead transmit the SRS.

The UE 115 may be scheduled with both CSI HARQ feedback reporting and SRS in an uplink slot 325 or a special slot 330. The special slot 330 may be used for uplink or downlink or both. In some cases, a portion of the special slot 330 may be allocated for uplink and a portion of the special slot 330 may be allocated for downlink.

Figure 4:
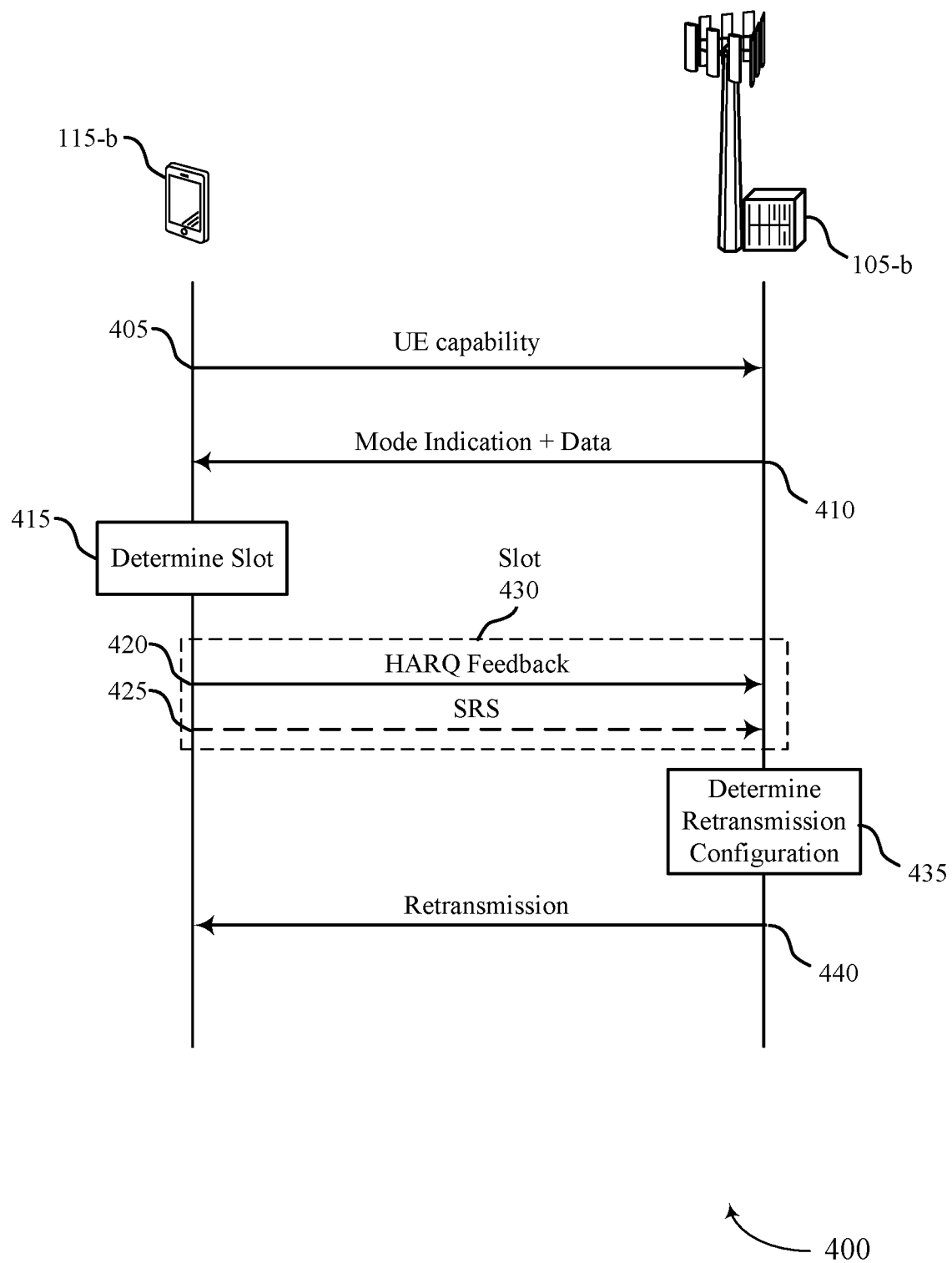
FIG. 4 illustrates an example of a process flow that supports efficient turbo HARQ feedback reporting in accordance with aspects of the present disclosure.

FIG. 4 illustrates an example of a process flow 400 that supports efficient turbo HARQ feedback reporting in accordance with aspects of the present disclosure. In some examples, process flow 400 may implement aspects of wireless communications system 100 or 200. Process flow 400 may be implemented by UE 115-b or base station 105-b, or both, which may be respective examples of a UE 115 and a base station 105 described herein.

At 405, UE 115-b may transmit, to base station 105-b, a UE capability associated with reference signal reporting by UE 115-b. For example, the UE capability may be based on a modem processing power, battery level, or power availability of UE 115-b.

At 410, UE 115-b may receive a data packet and an indication of a mode for reference signal reporting based on the UE capability. In some cases, the data packet and the indication for the mode may be received at different times. In some cases, the indication for the mode may be received via RRC signaling or a MAC E. In some cases, the indication for the mode may be received via downlink control information. For example, the indication may be included in downlink control information including a grant scheduling the data packet.

At 415, UE 115-b may determine that a slot 430 includes first resources for transmitting an SRS and second resources for transmitting HARQ feedback for the data packet. In some cases, UE 115-b may determine that at least a portion of the data packet was unsuccessfully decoded. UE 115-b may support turbo HARQ feedback reporting for an ultra-reliable retransmission.

UE 115-b may be configured with a mode for reference signal reporting. For example, UE 115-b may be configured with a mode for HARQ feedback reporting. In some cases, UE 115-b may determine that the mode for HARQ feedback reporting configures the UE to transmit the HARQ feedback and the SRS. This may be an example of a first mode described with reference to FIG. 2. If UE 115-b is configured with the first mode, UE 115-b may transmit the HARQ feedback at 420 and the SRS at 425 in the slot 430.

In some cases, UE 115-b may determine that the mode for HARQ feedback reporting configure the UE to transmit the HARQ feedback and CSI based on the HARQ feedback. This may be an example of a second mode described with reference to FIG. 2. If UE 115-b is configured with the second mode, UE 115-b may transmit the HARQ feedback with CSI at 420 in the slot 430 and not transmit the SRS at 425.

In some cases, UE 115-b may determine that the mode for HARQ feedback reporting configure the UE to transmit the HARQ feedback, the CSI associated with the HARQ feedback, and the SRS. This may be an example of a third mode described with reference to FIG. 2. If UE 115-*b* is configured with the third mode, UE 115-*b* may transmit the HARQ feedback with CSI at 420 and transmit the SRS at 425 in the slot 430.

Base station 105-*b* may receive the HARQ feedback and information based on the mode configured for UE 115-*b*.

At 435, base station 105-*b* may determine a retransmission configuration to retransmit the data packet. In some cases, base station 105-*b* may determine a coding length and select resources for the retransmission based on the received feedback. In some cases, base station 105-*b* may receive CSI and select an MCS based on the CSI. In some cases, base station 105-*b* may receive an SRS, and base station 105-*b* may perform channel estimation based on the SRS and select the retransmission configuration based on the channel estimation. In some cases, base station 105-*b* may determine a highly reliable retransmission configuration, such that the retransmission may have be successful. UE 115-*b* and base station 105-*b* may support low latency communications (e.g., URLLC) based on performing very few retransmissions (e.g., just a single retransmission).

At 440, base station 105-*b* may retransmit the data packet to UE 115-*b* using the determined retransmission configuration.

Figure 5:
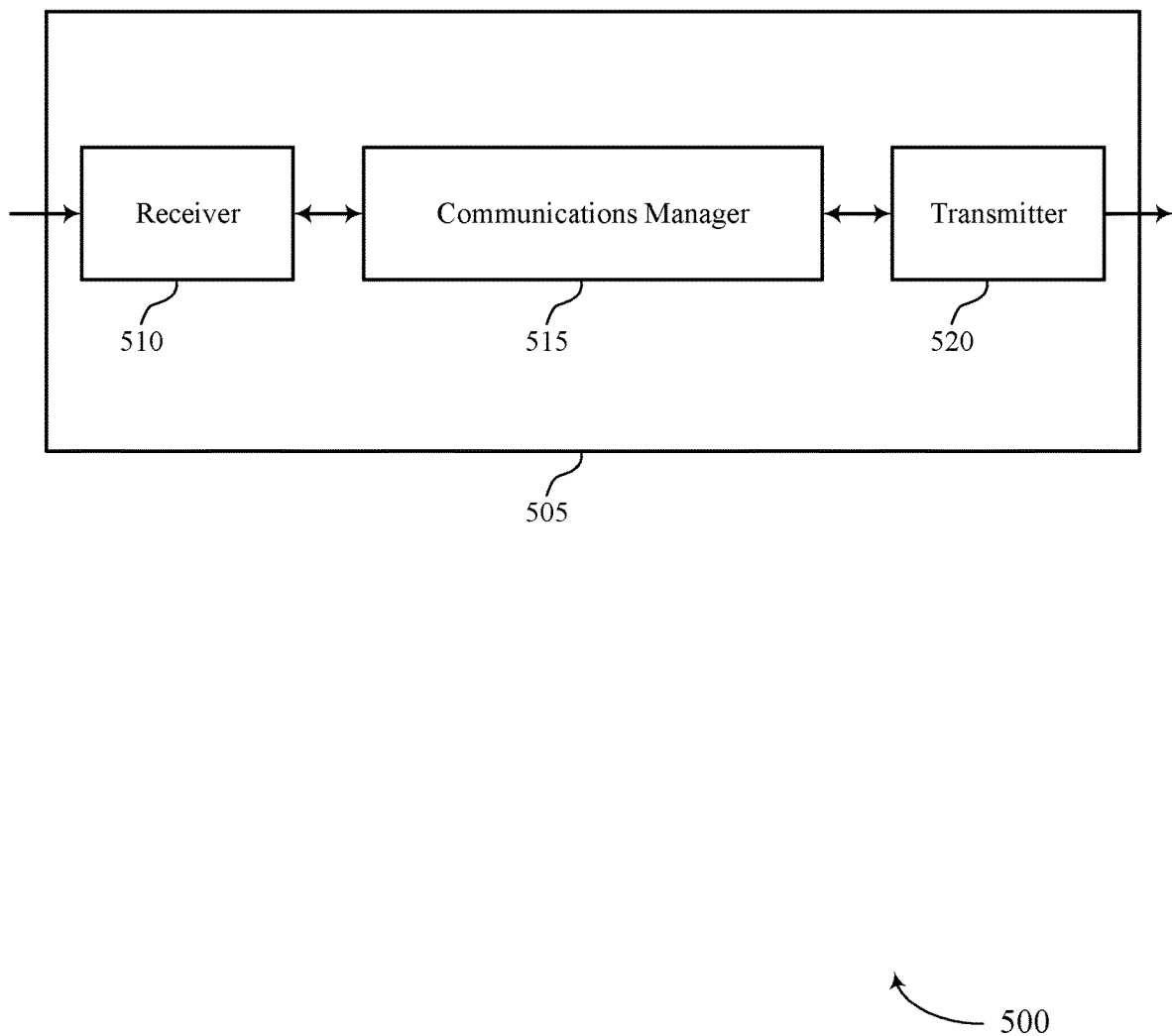
FIGS. 5 and 6 show block diagrams of devices that support efficient turbo HARQ feedback reporting in accordance with aspects of the present disclosure.

FIG. 5 shows a block diagram 500 of a device 505 that supports efficient turbo HARQ feedback reporting in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to efficient turbo HARQ feedback reporting, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a UE capability associated with reference signal reporting by the UE. The communications manager 515 may receive, from the base station, a data packet and an indication of a mode for the reference signal reporting based on the UE capability. The communications manager 515 may determine that a slot includes first resources for transmitting an SRS and second resources for transmitting HARQ feedback for the data packet. The communications manager 515 may transmit, to the base station during the slot and based on the indication of the mode for the reference signal reporting, the HARQ feedback and one or more of the SRS or channel state information associated with the HARQ feedback. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may allow a UE 115 to save power and increase battery life by refraining from transmitting SRS or refraining from calculating CSI based on a mode configured for the UE 115. For example, if the UE does not transmit SRS, the UE may save power and prevent possible insertion loss from SRS antenna switching. CSI may be a computationally expensive procedure, so refraining from calculating CSI may also save power at the UE. In some cases, the UE may implement these techniques to transmit either CSI with HARQ feedback or SRS while still acquiring ultra-reliable retransmissions or performing channel maintenance. For example, in some cases, some information determined by a base station 105 based on an SRS may be indicated by CSI parameters. Therefore, the UE 115 transmitting the SRS may, in some cases, be redundant. By just transmitting the CSI with the HARQ feedback, the base station 105 may still have channel information while the UE 115 reduces power consumption.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
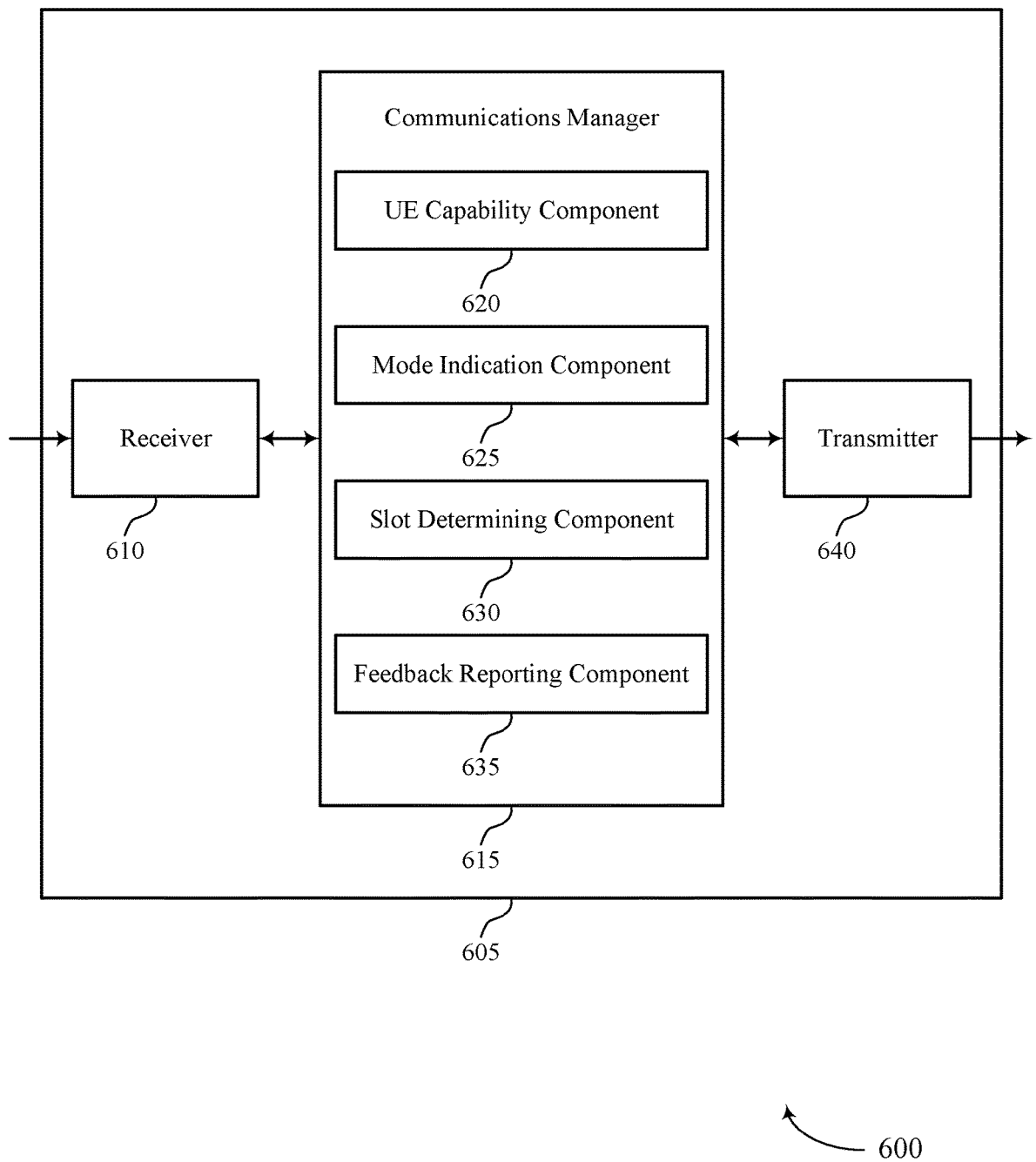

FIG. 6 shows a block diagram 600 of a device 605 that supports efficient turbo HARQ feedback reporting in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to efficient turbo HARQ feedback reporting, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a UE capability component 620, a mode indication component 625, a slot determining component 630, and a feedback reporting component 635. The communications manager 615 may be an example of aspects of the communications manager 810 described herein.

The UE capability component 620 may transmit, to a base station, a UE capability associated with reference signal reporting by the UE. The mode indication component 625 may receive, from the base station, a data packet and an indication of a mode for reference signal reporting based on the UE capability. The slot determining component 630 may determine that a slot includes first resources for transmitting an SRS and second resources for transmitting HARQ feedback for the data packet. The feedback reporting component 635 may transmit, to the base station during the slot and based on the indication of the mode for the reference signal reporting, the HARQ feedback and one or more of the SRS or channel state information associated with the HARQ feedback.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
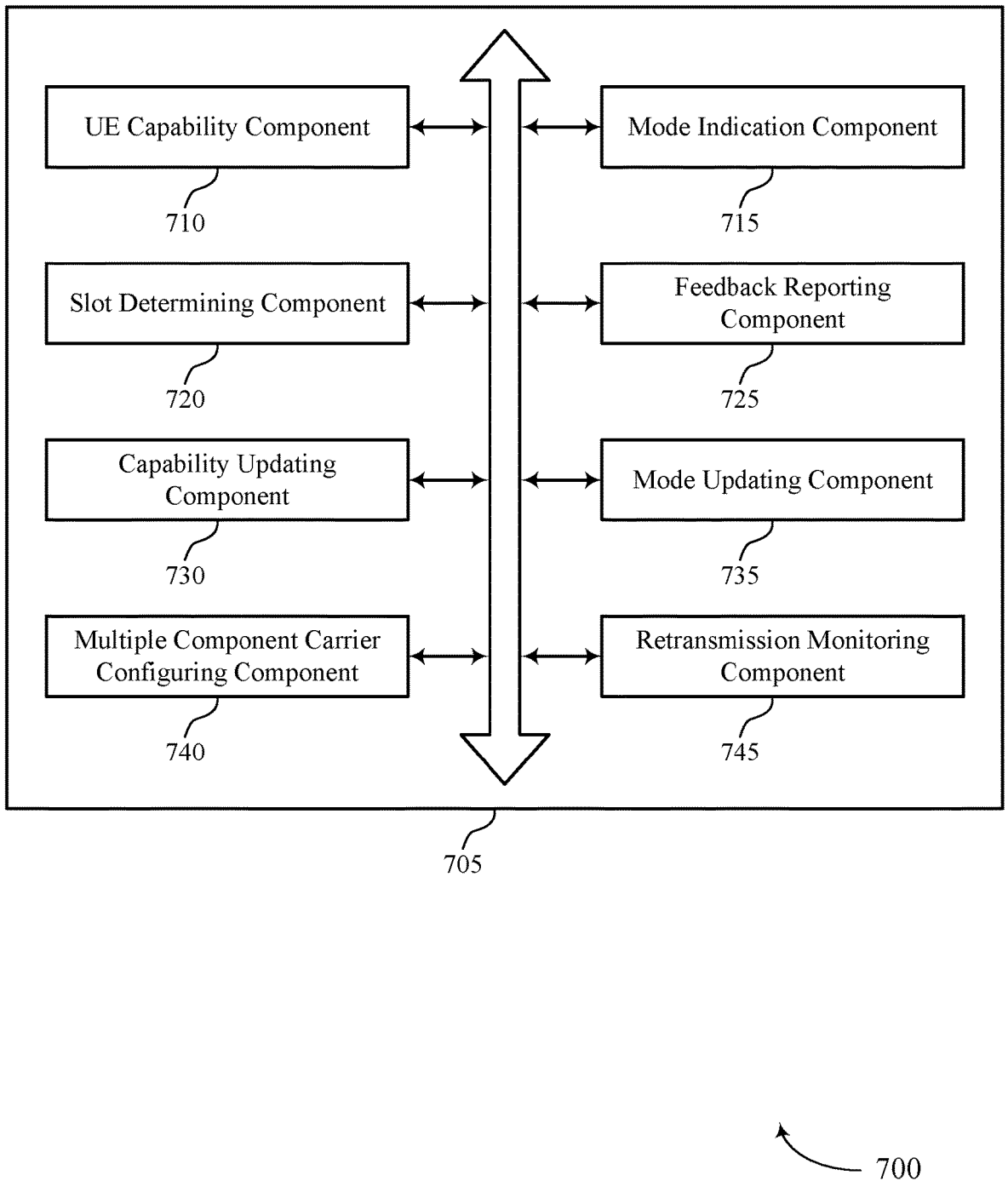
FIG. 7 shows a block diagram of a communications manager that supports efficient turbo HARQ feedback reporting in accordance with aspects of the present disclosure.

FIG. 7 shows a block diagram 700 of a communications manager 705 that supports efficient turbo HARQ feedback reporting in accordance with aspects of the present disclosure. The communications manager 705 may be an example of aspects of a communications manager 515, a communications manager 615, or a communications manager 810 described herein. The communications manager 705 may include a UE capability component 710, a mode indication component 715, a slot determining component 720, a feedback reporting component 725, a capability updating component 730, a mode updating component 735, a multiple component carrier configuring component 740, and a retransmission monitoring component 745. Each of these modules may communicate, directly or indirectly, with one another (e.g., via one or more buses).

The UE capability component 710 may transmit, to a base station, a UE capability associated with reference signal reporting by the UE. In some examples, the UE capability component 710 may transmit the UE capability via uplink control information, a MAC CE, or both. In some cases, the UE capability for reference signal reporting is based on one or more of battery status, processing capability, modem capability, and channel conditions. In some cases, the indication includes a bitmap, where each bit of the bitmap corresponds to a different mode for the reference signal reporting supported by the UE.

The mode indication component 715 may receive, from the base station, a data packet and an indication of a mode for the reference signal reporting based on the UE capability. In some examples, the mode indication component 715 may receive radio resource control signaling or a MAC CE including the indication of the mode for the reference signal reporting. In some examples, the mode indication component 715 may receive downlink control information including the indication of the mode for the reference signal reporting.

The slot determining component 720 may determine that a slot includes first resources for transmitting an SRS and second resources for transmitting HARQ feedback for the data packet.

The feedback reporting component 725 may transmit, to the base station during the slot and based on the indication of the mode for the reference signal reporting, the HARQ feedback and one or more of the SRS or channel state information associated with the HARQ feedback. In some examples, the feedback reporting component 725 may determine that the mode for the reference signal reporting configures the UE to transmit the HARQ feedback and the SRS, where transmitting the HARQ feedback and one or more of the SRS or the channel state information associated with the HARQ feedback is based on the determining.

In some examples, the feedback reporting component 725 may determine that the mode for the reference signal reporting configures the UE to transmit the HARQ feedback and the channel state information associated with the HARQ feedback, where transmitting the HARQ feedback and one or more of the SRS or the channel state information associated with the HARQ feedback is based on the determining.

In some examples, the feedback reporting component 725 may determine that the mode for the reference signal reporting configures the UE to transmit the HARQ feedback, the channel state information associated with the HARQ feedback, and the SRS, where transmitting the HARQ feedback and one or more of the SRS or the channel state information associated with the HARQ feedback is based on the determining. In some examples, determining that the UE cannot meet a timeline for calculating the channel state information associated with the HARQ feedback, where the transmitting includes transmitting the HARQ feedback and the SRS based on determining that the UE cannot meet the timeline.

The capability updating component 730 may transmit an updated UE capability based on a change to a power availability at the UE, a change to a processing capability at the UE, a change to one or more channel conditions, or any combination thereof, where the indication of the mode for the reference signal reporting is based on the updated UE capability.

The mode updating component 735 may receive a second indication of an updated mode for the HARQ feedback reporting from the base station, where transmitting the HARQ feedback and one or more of the SRS or the channel state information associated with the HARQ feedback is based on the updated mode for the HARQ feedback reporting.

The multiple component carrier configuring component 740 may determine a set of component carriers are configured for the UE. In some examples, the multiple component carrier configuring component 740 may determine, based on the indication of the mode for the reference signal reporting, a corresponding mode for each component carrier of the set of component carriers, where transmitting the HARQ feedback and one or more of the SRS or the channel state information associated with the HARQ feedback on each component carrier of the set of component carriers is based on the corresponding mode. In some cases, the UE capability is based on one or more channel conditions for each component carrier of the set of component carriers. In some cases, a first mode corresponds to a first component carrier of the set of component carriers, and a second mode corresponds to a second component carrier of the set of component carriers, where the first mode and the second mode are different.

The retransmission monitoring component 745 may monitor for a retransmission of the data packet from the base station based on transmitting the HARQ feedback and one or more of the SRS or the channel state information associated with the HARQ feedback.

Figure 8:
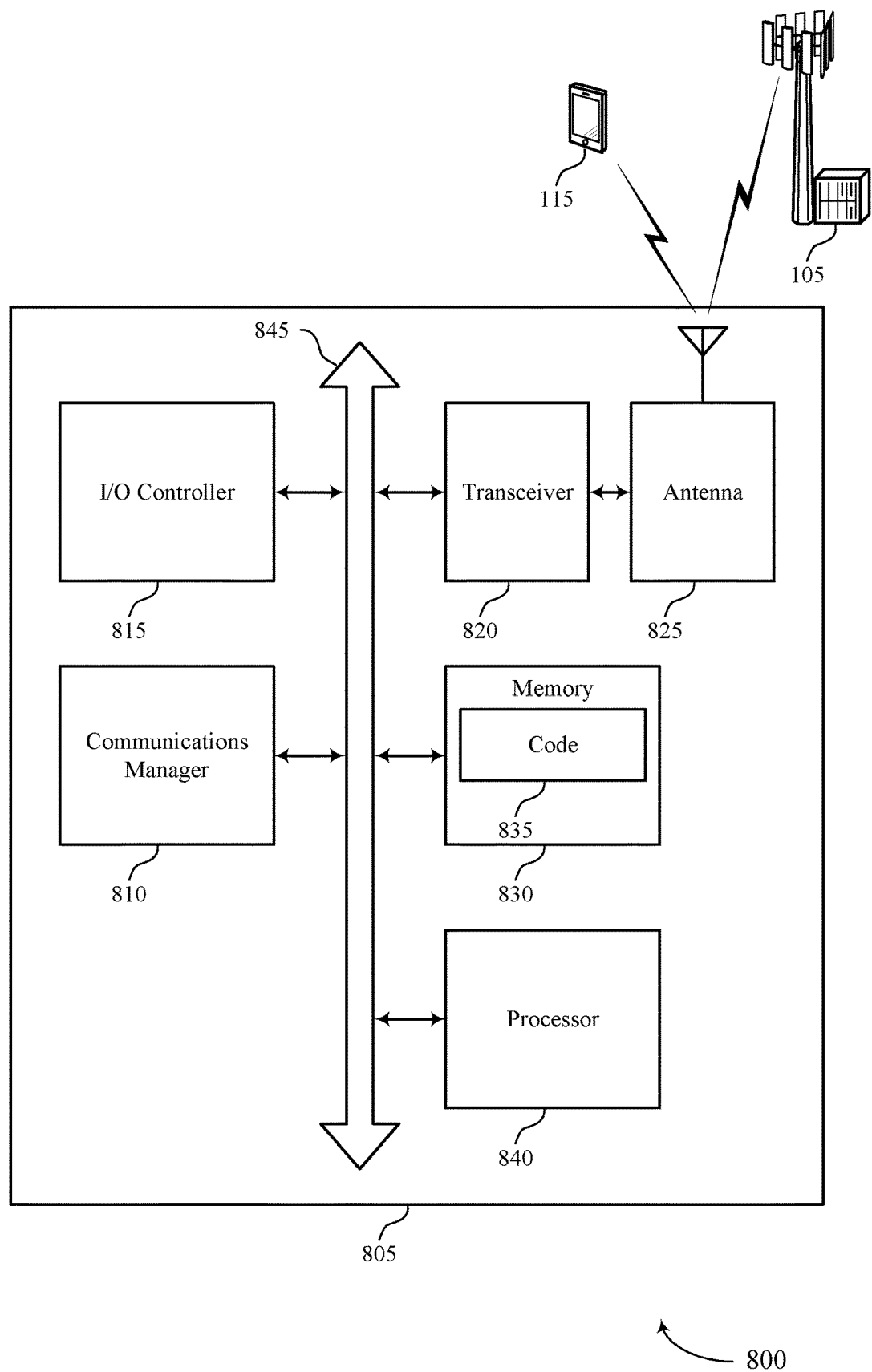
FIG. 8 shows a diagram of a system including a device that supports efficient turbo HARQ feedback reporting in accordance with aspects of the present disclosure.

FIG. 8 shows a diagram of a system 800 including a device 805 that supports efficient turbo HARQ feedback reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, a UE capability associated with reference signal reporting by the UE. The communications manager 810 may receive, from the base station, a data packet and an indication of a mode for the reference signal reporting based on the UE capability. The communications manager 810 may determine that a slot includes first resources for transmitting an SRS and second resources for transmitting HARQ feedback for the data packet. The communications manager 810 may transmit, to the base station during the slot and based on the indication of the mode for the reference signal reporting, the HARQ feedback and one or more of the SRS or channel state information associated with the HARQ feedback.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting efficient turbo HARQ feedback reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
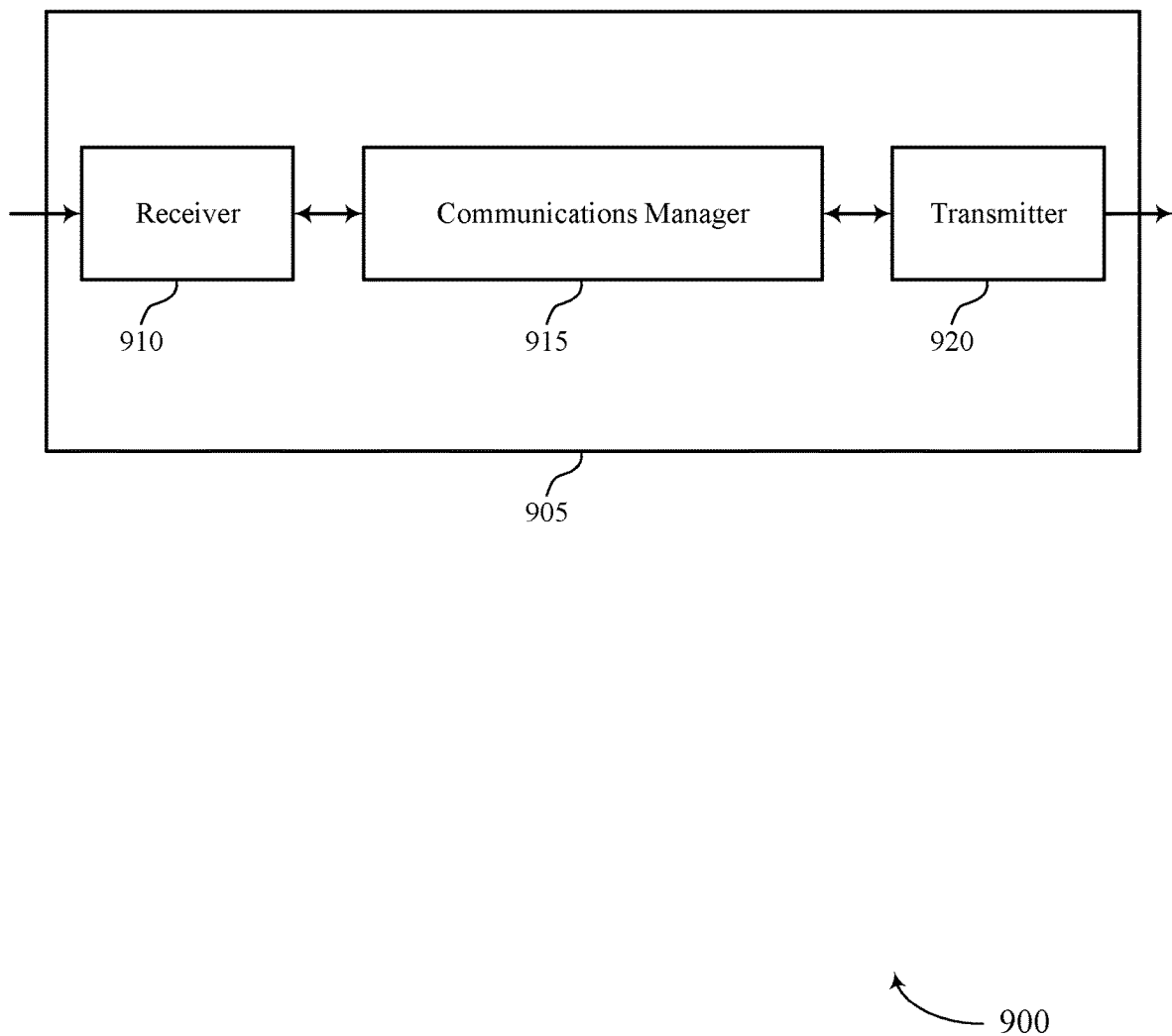
FIGS. 9 and 10 show block diagrams of devices that support efficient turbo HARQ feedback reporting in accordance with aspects of the present disclosure.

FIG. 9 shows a block diagram 900 of a device 905 that supports efficient turbo HARQ feedback reporting in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to efficient turbo HARQ feedback reporting, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a UE capability associated with reference signal reporting by the UE. The communications manager 915 may select a mode for the UE for the reference signal reporting based on the UE capability. The communications manager 915 may transmit, to the UE, a data packet and an indication of the mode for the reference signal reporting. The communications manager 915 may schedule the UE with first resources for HARQ feedback of the data packet in a slot including second resources for transmitting an SRS. The communications manager 915 may receive, from the UE during the slot and based on the mode for the reference signal reporting, the HARQ feedback and one or more of the SRS or channel state information associated with the HARQ feedback. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
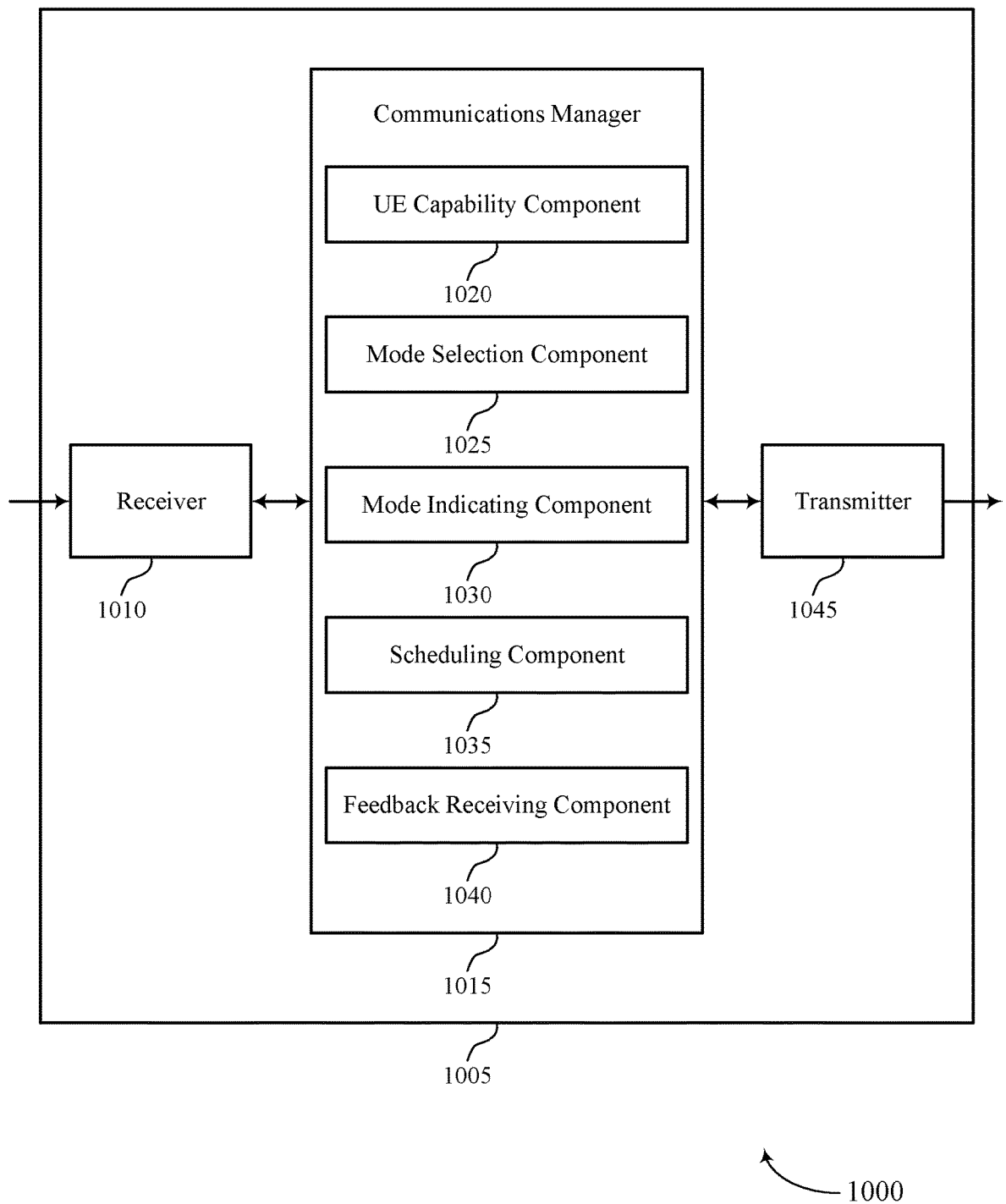

FIG. 10 shows a block diagram 1000 of a device 1005 that supports efficient turbo HARQ feedback reporting in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to efficient turbo HARQ feedback reporting, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE capability component 1020, a mode selection component 1025, a mode indicating component 1030, a scheduling component 1035, and a feedback receiving component 1040. The communications manager 1015 may be an example of aspects of the communications manager 1210 described herein.

The UE capability component 1020 may receive, from a UE, a UE capability associated with reference signal reporting by the UE. The mode selection component 1025 may select a mode for the UE for the reference signal reporting based on the UE capability. The mode indicating component 1030 may transmit, to the UE, a data packet and an indication of the mode for the reference signal reporting. The scheduling component 1035 may schedule the UE with first resources for HARQ feedback of the data packet in a slot including second resources for transmitting an SRS. The feedback receiving component 1040 may receive, from the UE during the slot and based on the mode for the reference signal reporting, the HARQ feedback and one or more of the SRS or channel state information associated with the HARQ feedback.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
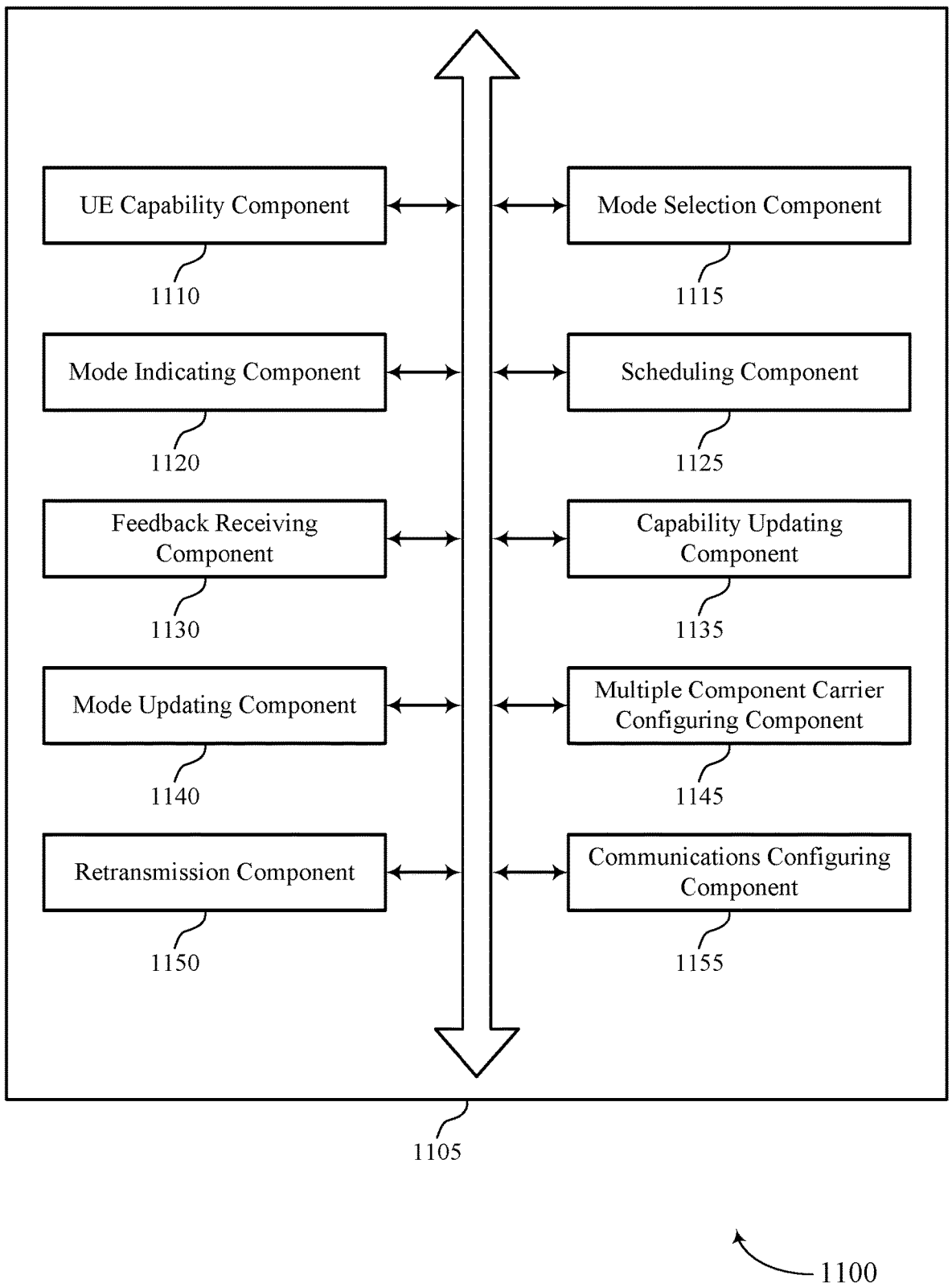
FIG. 11 shows a block diagram of a communications manager that supports efficient turbo HARQ feedback reporting in accordance with aspects of the present disclosure.

FIG. 11 shows a block diagram 1100 of a communications manager 1105 that supports efficient turbo HARQ feedback reporting in accordance with aspects of the present disclosure. The communications manager 1105 may be an example of aspects of a communications manager 915, a communications manager 1015, or a communications manager 1210 described herein. The communications manager 1105 may include a UE capability component 1110, a mode selection component 1115, a mode indicating component 1120, a scheduling component 1125, a feedback receiving component 1130, a capability updating component 1135, a mode updating component 1140, a multiple component carrier configuring component 1145, a retransmission component 1150, and a communications configuring component 1155. Each of these modules may communicate, directly or indirectly, with one another (e.g., via one or more buses).

The UE capability component 1110 may receive, from a UE, a UE capability associated with reference signal reporting by the UE. In some examples, the UE capability component 1110 may receive the UE capability via uplink control information, a MAC CE, or both.

The mode selection component 1115 may select a mode for the UE for the reference signal reporting based on the UE capability. In some examples, the mode selection component 1115 may select the mode for the reference signal reporting to configure the UE to transmit the HARQ feedback and the SRS. In some examples, the mode selection component 1115 may select the mode for the reference signal reporting to configure the UE to transmit the HARQ feedback and the channel state information associated with the HARQ feedback.

In some examples, the mode selection component 1115 may select the mode for the reference signal reporting to configure the UE to transmit the HARQ feedback, the channel state information associated with the HARQ feedback, and the SRS.

The mode indicating component 1120 may transmit, to the UE, a data packet and an indication of the mode for the reference signal reporting. In some examples, the mode indicating component 1120 may transmit radio resource control signaling or a MAC CE including the indication of the mode for the reference signal reporting. In some examples, the mode indicating component 1120 may transmit downlink control information including the indication of the mode for the reference signal reporting.

In some examples, the mode indicating component 1120 may select a second mode for a second UE for the reference signal reporting based on a second UE capability, where the second mode is different from the first mode. In some examples, the mode indicating component 1120 may transmit, to the second UE, a second indication of the second mode for the reference signal reporting.

The scheduling component 1125 may schedule the UE with first resources for HARQ feedback of the data packet in a slot including second resources for transmitting an SRS.

The feedback receiving component 1130 may receive, from the UE during the slot and based on the mode for the reference signal reporting, the HARQ feedback and one or more of the SRS or channel state information associated with the HARQ feedback.

In some examples, the feedback receiving component 1130 may determine that the base station cannot process the SRS, where the mode for the reference signal reporting configures the UE to transmit the HARQ feedback and the channel state information associated with the HARQ feedback based on the determining.

The capability updating component 1135 may receive an updated UE capability based on a change to a power availability at the UE, a change to a processing capability at the UE, a change to one or more channel conditions, or any combination thereof, where selecting the mode for the reference signal reporting is based on the updated UE capability. The mode updating component 1140 may transmit a second indication of an updated mode for the HARQ feedback reporting to the UE.

The multiple component carrier configuring component 1145 may determine a set of component carriers are configured for the UE, where selecting the mode for the UE for the HARQ feedback reporting includes selecting a corresponding mode for each component carrier of the set of component carriers, where the indication of the mode for the reference signal reporting indicates the corresponding mode for the reference signal reporting for each component carrier of the set of component carriers. In some cases, the UE capability is based on channel conditions for each component carrier of the set of component carriers. In some cases, a first mode corresponds to a first component carrier of the set of component carriers, and a second mode corresponds to a second component carrier of the set of component carriers, where the first mode and the second mode are different.

The retransmission component 1150 may retransmit the data packet to the UE based on the HARQ feedback. The retransmission component 1150 may determine an MCS for retransmitting the data packet, a resource for retransmitting the data packet, or both, based on receiving the channel state information associated with the HARQ feedback, where retransmitting the data is based on determining the MCS for retransmitting the data packet, the resource for retransmitting the data packet, or both.

The communications configuring component 1155 may determine a precoding beam for communications with the UE based on receiving the SRS. In some examples, the communications configuring component 1155 may determine one or more of a precoding matrix index, a channel quality index, a channel rank, and a retransmission configuration based on receiving the SRS, where the mode for the reference signal reporting configures the UE to transmit the HARQ feedback and the SRS. In some cases, the mode for the reference signal reporting configures the UE to transmit the HARQ feedback and the SRS based on a cell loading of the base station, a retransmission frequency of the UE, or a channel state information processing capability of the UE.

Figure 12:
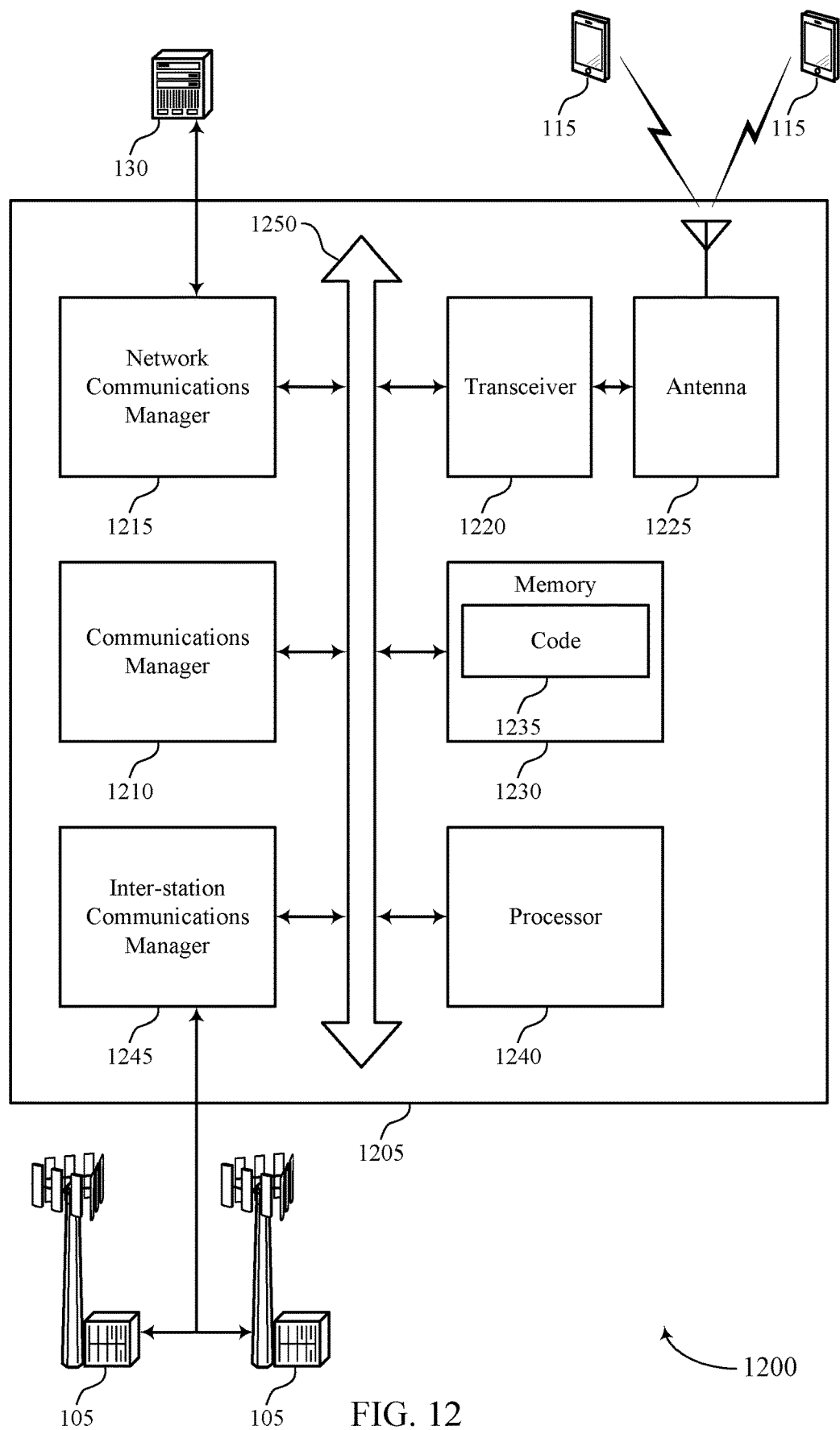
FIG. 12 shows a diagram of a system including a device that supports efficient turbo HARQ feedback reporting in accordance with aspects of the present disclosure.

FIG. 12 shows a diagram of a system 1200 including a device 1205 that supports efficient turbo HARQ feedback reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a UE capability associated with reference signal reporting by the UE, select a mode for the UE for the reference signal reporting based on the UE capability. The communications manager 1210 may transmit, to the UE, a data packet and an indication of the mode for the reference signal reporting. The communications manager 1210 may schedule the UE with first resources for HARQ feedback of the data packet in a slot including second resources for transmitting an SRS. The communications manager 1210 may receive, from the UE during the slot and based on the mode for the reference signal reporting, the HARQ feedback and one or more of the SRS or channel state information associated with the HARQ feedback.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting efficient turbo HARQ feedback reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
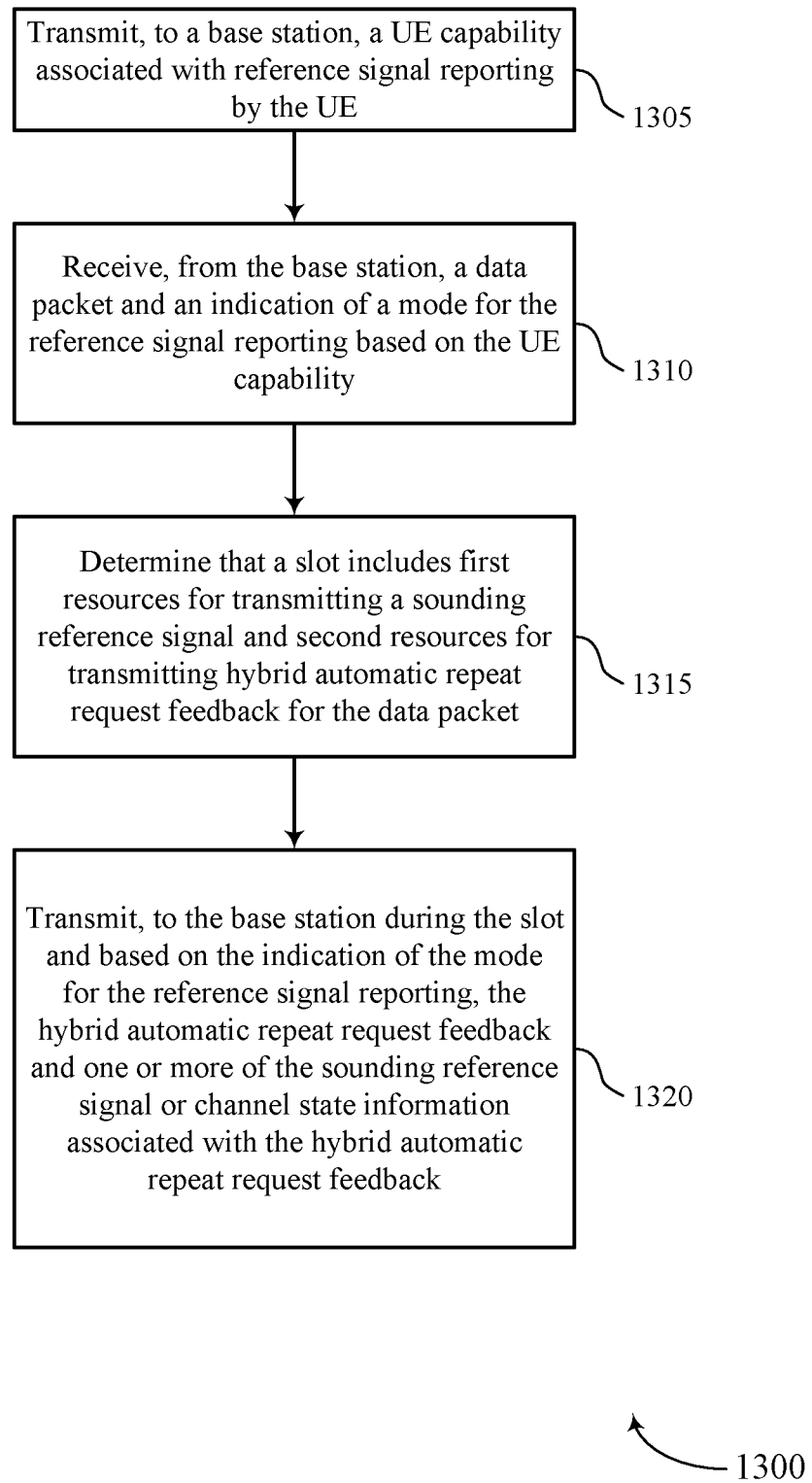
FIGS. 13 through 18 show flowcharts illustrating methods that support efficient turbo HARQ feedback reporting in accordance with aspects of the present disclosure.

FIG. 13 shows a flowchart illustrating a method 1300 that supports efficient turbo HARQ feedback reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may transmit, to a base station, a UE capability associated with reference signal reporting by the UE. The operations of 1305 may be performed according to the methods described herein. In some examples, aspects of the operations of 1305 may be performed by a UE capability component as described with reference to FIGS. 5 through 8.

At 1310, the UE may receive, from the base station, a data packet and an indication of a mode for the reference signal reporting based on the UE capability. The operations of 1310 may be performed according to the methods described herein. In some examples, aspects of the operations of 1310 may be performed by a mode indication component as described with reference to FIGS. 5 through 8.

At 1315, the UE may determine that a slot includes first resources for transmitting an SRS and second resources for transmitting HARQ feedback for the data packet. The operations of 1315 may be performed according to the methods described herein. In some examples, aspects of the operations of 1315 may be performed by a slot determining component as described with reference to FIGS. 5 through 8.

At 1320, the UE may transmit, to the base station during the slot and based on the indication of the mode for the reference signal reporting, the HARQ feedback and one or more of the SRS or channel state information associated with the HARQ feedback. The operations of 1320 may be performed according to the methods described herein. In some examples, aspects of the operations of 1320 may be performed by a feedback reporting component as described with reference to FIGS. 5 through 8.

Figure 14:
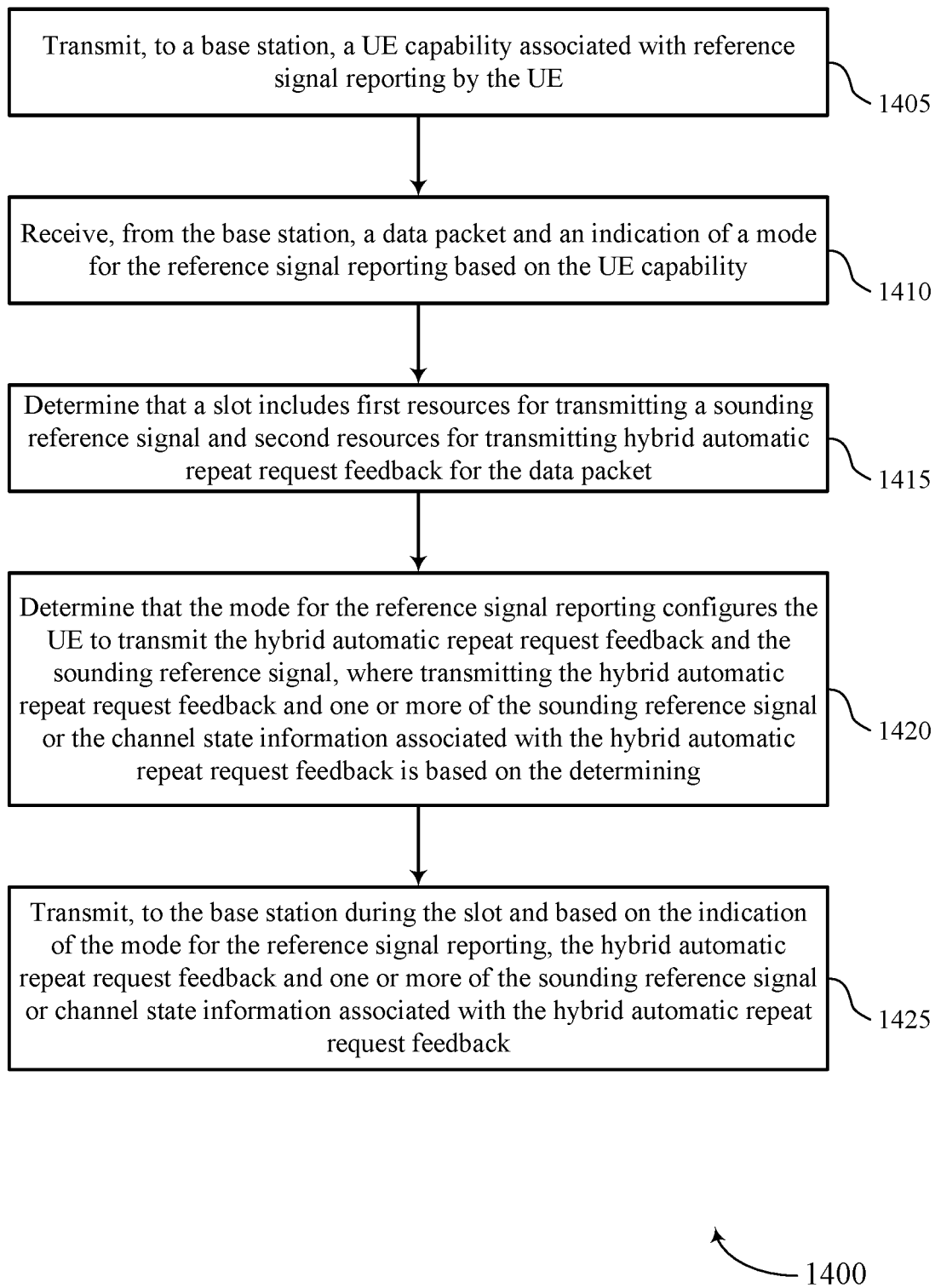

FIG. 14 shows a flowchart illustrating a method 1400 that supports efficient turbo HARQ feedback reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may transmit, to a base station, a UE capability associated with reference signal reporting by the UE. The operations of 1405 may be performed according to the methods described herein. In some examples, aspects of the operations of 1405 may be performed by a UE capability component as described with reference to FIGS. 5 through 8.

At 1410, the UE may receive, from the base station, a data packet and an indication of a mode for the reference signal reporting based on the UE capability. The operations of 1410 may be performed according to the methods described herein. In some examples, aspects of the operations of 1410 may be performed by a mode indication component as described with reference to FIGS. 5 through 8.

At 1415, the UE may determine that a slot includes first resources for transmitting an SRS and second resources for transmitting HARQ feedback for the data packet. The operations of 1415 may be performed according to the methods described herein. In some examples, aspects of the operations of 1415 may be performed by a slot determining component as described with reference to FIGS. 5 through 8.

At 1420, the UE may determine that the mode for the reference signal reporting configures the UE to transmit the HARQ feedback and the SRS, where transmitting the HARQ feedback and one or more of the SRS or the channel state information associated with the HARQ feedback is based on the determining. The operations of 1420 may be performed according to the methods described herein. In some examples, aspects of the operations of 1420 may be performed by a feedback reporting component as described with reference to FIGS. 5 through 8.

At 1425, the UE may transmit, to the base station during the slot and based on the indication of the mode for the reference signal reporting, the HARQ feedback and one or more of the SRS or channel state information associated with the HARQ feedback. The operations of 1425 may be performed according to the methods described herein. In some examples, aspects of the operations of 1425 may be performed by a feedback reporting component as described with reference to FIGS. 5 through 8.

Figure 15:
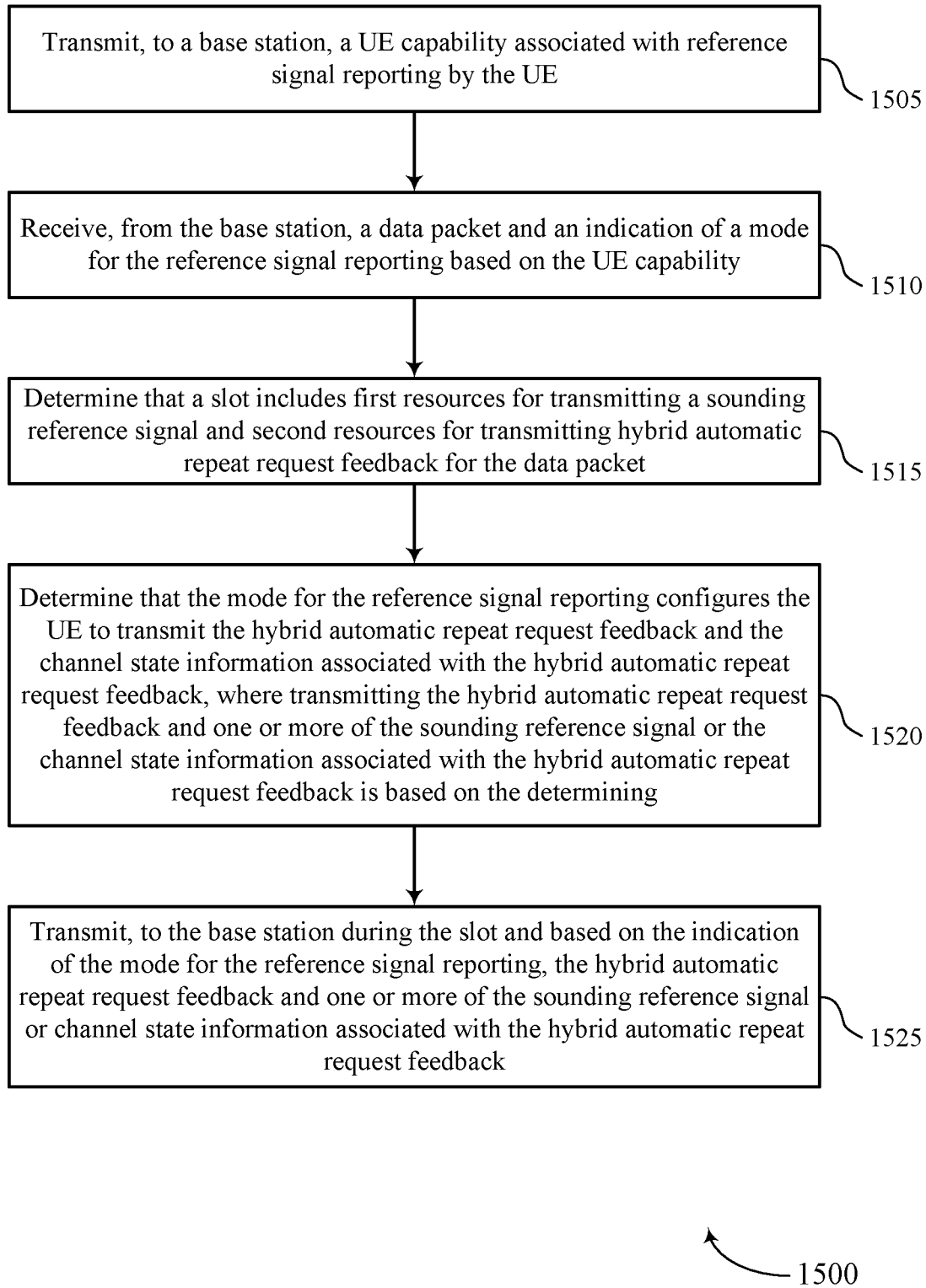

FIG. 15 shows a flowchart illustrating a method 1500 that supports efficient turbo HARQ feedback reporting in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1505, the UE may transmit, to a base station, a UE capability associated with reference signal reporting by the UE. The operations of 1505 may be performed according to the methods described herein. In some examples, aspects of the operations of 1505 may be performed by a UE capability component as described with reference to FIGS. 5 through 8.

At 1510, the UE may receive, from the base station, a data packet and an indication of a mode for the reference signal reporting based on the UE capability. The operations of 1510 may be performed according to the methods described herein. In some examples, aspects of the operations of 1510 may be performed by a mode indication component as described with reference to FIGS. 5 through 8.

At 1515, the UE may determine that a slot includes first resources for transmitting an SRS and second resources for transmitting HARQ feedback for the data packet. The operations of 1515 may be performed according to the methods described herein. In some examples, aspects of the operations of 1515 may be performed by a slot determining component as described with reference to FIGS. 5 through 8.

At 1520, the UE may determine that the mode for the reference signal reporting configures the UE to transmit the HARQ feedback and the channel state information associated with the HARQ feedback, where transmitting the HARQ feedback and one or more of the SRS or the channel state information associated with the HARQ feedback is based on the determining. The operations of 1520 may be performed according to the methods described herein. In some examples, aspects of the operations of 1520 may be performed by a feedback reporting component as described with reference to FIGS. 5 through 8.

At 1525, the UE may transmit, to the base station during the slot and based on the indication of the mode for the reference signal reporting, the HARQ feedback and one or more of the SRS or channel state information associated with the HARQ feedback. The operations of 1525 may be performed according to the methods described herein. In some examples, aspects of the operations of 1525 may be performed by a feedback reporting component as described with reference to FIGS. 5 through 8.

Figure 16:
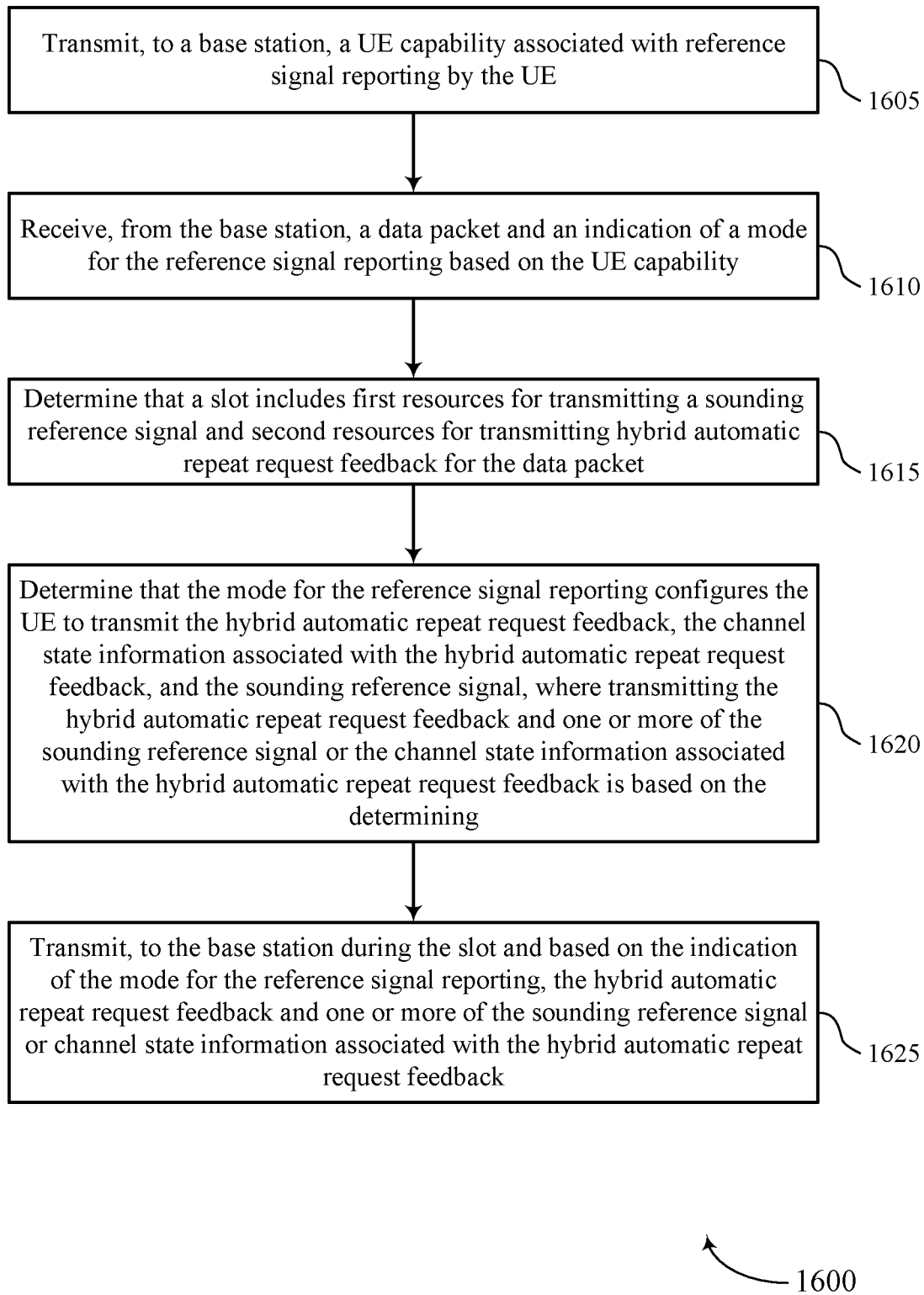

FIG. 16 shows a flowchart illustrating a method 1600 that supports efficient turbo HARQ feedback reporting in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1605, the UE may transmit, to a base station, a UE capability associated with reference signal reporting by the UE. The operations of 1605 may be performed according to the methods described herein. In some examples, aspects of the operations of 1605 may be performed by a UE capability component as described with reference to FIGS. 5 through 8.

At 1610, the UE may receive, from the base station, a data packet and an indication of a mode for the reference signal reporting based on the UE capability. The operations of 1610 may be performed according to the methods described herein. In some examples, aspects of the operations of 1610 may be performed by a mode indication component as described with reference to FIGS. 5 through 8.

At 1615, the UE may determine that a slot includes first resources for transmitting an SRS and second resources for transmitting HARQ feedback for the data packet. The operations of 1615 may be performed according to the methods described herein. In some examples, aspects of the operations of 1615 may be performed by a slot determining component as described with reference to FIGS. 5 through 8.

At 1620, the UE may determine that the mode for the reference signal reporting configures the UE to transmit the HARQ feedback, the channel state information associated with the HARQ feedback, and the SRS, where transmitting the HARQ feedback and one or more of the SRS or the channel state information associated with the HARQ feedback is based on the determining. The operations of 1620 may be performed according to the methods described herein. In some examples, aspects of the operations of 1620 may be performed by a feedback reporting component as described with reference to FIGS. 5 through 8.

At 1625, the UE may transmit, to the base station during the slot and based on the indication of the mode for the reference signal reporting, the HARQ feedback and one or more of the SRS or channel state information associated with the HARQ feedback. The operations of 1625 may be performed according to the methods described herein. In some examples, aspects of the operations of 1625 may be performed by a feedback reporting component as described with reference to FIGS. 5 through 8.

Figure 17:
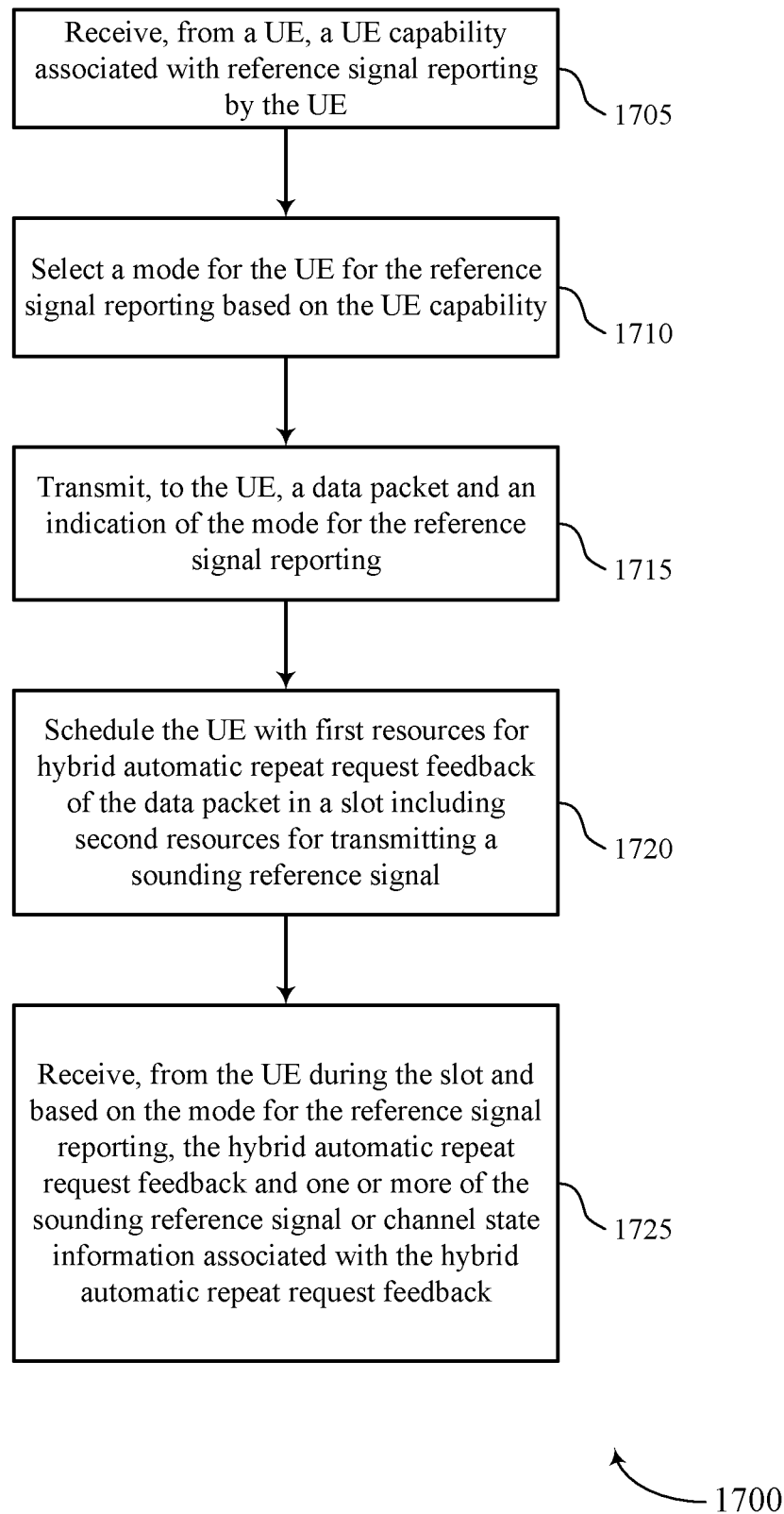

FIG. 17 shows a flowchart illustrating a method 1700 that supports efficient turbo HARQ feedback reporting in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1705, the base station may receive, from a UE, a UE capability associated with reference signal reporting by the UE. The operations of 1705 may be performed according to the methods described herein. In some examples, aspects of the operations of 1705 may be performed by a UE capability component as described with reference to FIGS. 9 through 12.

At 1710, the base station may select a mode for the UE for the reference signal reporting based on the UE capability. The operations of 1710 may be performed according to the methods described herein. In some examples, aspects of the operations of 1710 may be performed by a mode selection component as described with reference to FIGS. 9 through 12.

At 1715, the base station may transmit, to the UE, a data packet and an indication of the mode for the reference signal reporting. The operations of 1715 may be performed according to the methods described herein. In some examples, aspects of the operations of 1715 may be performed by a mode indicating component as described with reference to FIGS. 9 through 12.

At 1720, the base station may schedule the UE with first resources for HARQ feedback of the data packet in a slot including second resources for transmitting an SRS. The operations of 1720 may be performed according to the methods described herein. In some examples, aspects of the operations of 1720 may be performed by a scheduling component as described with reference to FIGS. 9 through 12.

At 1725, the base station may receive, from the UE during the slot and based on the mode for the reference signal reporting, the HARQ feedback and one or more of the SRS or channel state information associated with the HARQ feedback. The operations of 1725 may be performed according to the methods described herein. In some examples, aspects of the operations of 1725 may be performed by a feedback receiving component as described with reference to FIGS. 9 through 12.

Figure 18:
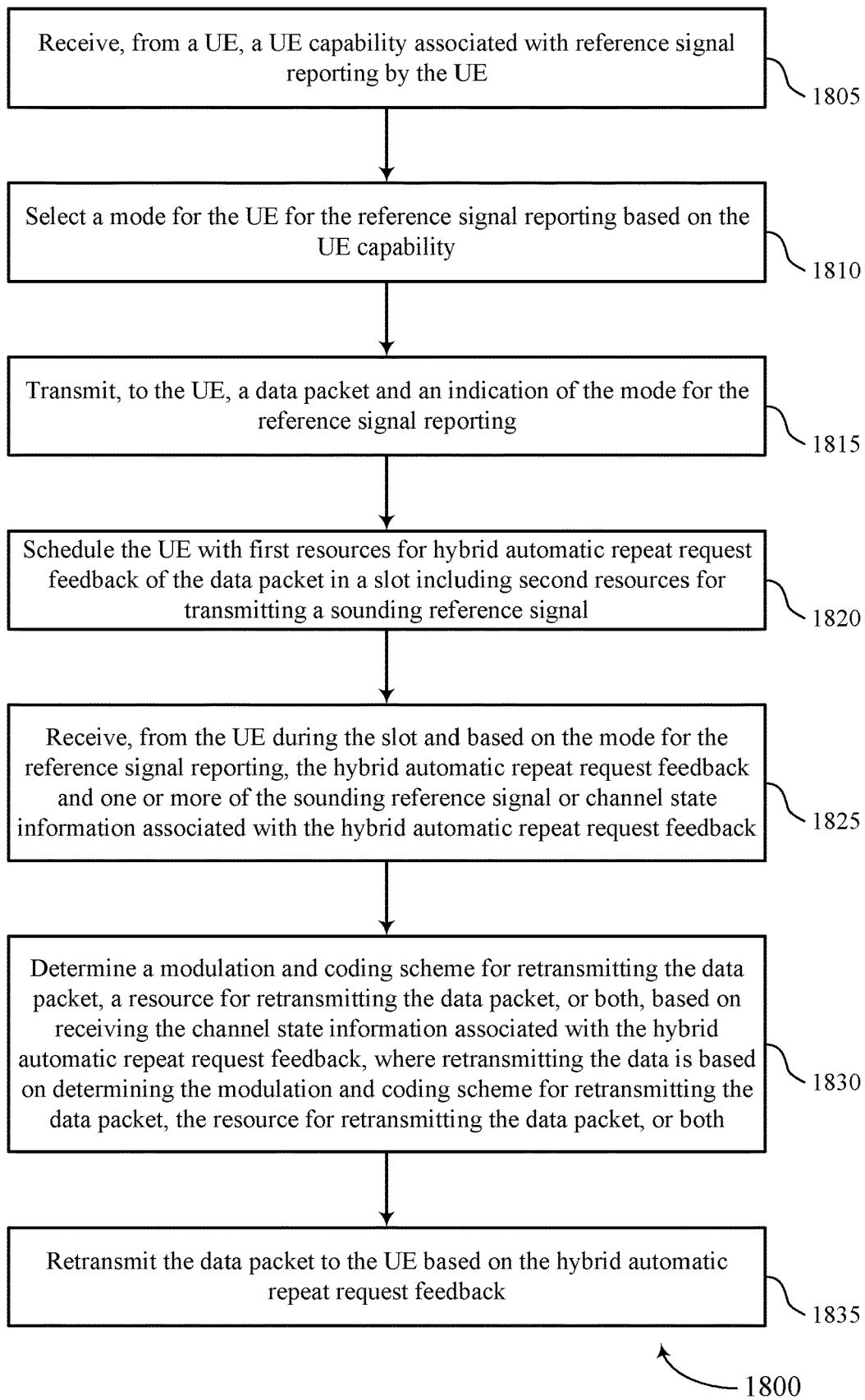

FIG. 18 shows a flowchart illustrating a method 1800 that supports efficient turbo HARQ feedback reporting in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1805, the base station may receive, from a UE, a UE capability associated with reference signal reporting by the UE. The operations of 1805 may be performed according to the methods described herein. In some examples, aspects of the operations of 1805 may be performed by a UE capability component as described with reference to FIGS. 9 through 12.

At 1810, the base station may select a mode for the UE for the reference signal reporting based on the UE capability. The operations of 1810 may be performed according to the methods described herein. In some examples, aspects of the operations of 1810 may be performed by a mode selection component as described with reference to FIGS. 9 through 12.

At 1815, the base station may transmit, to the UE, a data packet and an indication of the mode for the reference signal reporting. The operations of 1815 may be performed according to the methods described herein. In some examples, aspects of the operations of 1815 may be performed by a mode indicating component as described with reference to FIGS. 9 through 12.

At 1820, the base station may schedule the UE with first resources for HARQ feedback of the data packet in a slot including second resources for transmitting an SRS. The operations of 1820 may be performed according to the methods described herein. In some examples, aspects of the operations of 1820 may be performed by a scheduling component as described with reference to FIGS. 9 through 12.

At 1825, the base station may receive, from the UE during the slot and based on the mode for the reference signal reporting, the HARQ feedback and one or more of the SRS or channel state information associated with the HARQ feedback. The operations of 1825 may be performed according to the methods described herein. In some examples, aspects of the operations of 1825 may be performed by a feedback receiving component as described with reference to FIGS. 9 through 12.

At 1830, the base station may determine an MCS for retransmitting the data packet, a resource for retransmitting the data packet, or both, based on receiving the channel state information associated with the HARQ feedback, where retransmitting the data is based on determining the MCS for retransmitting the data packet, the resource for retransmitting the data packet, or both. The operations of 1830 may be performed according to the methods described herein. In some examples, aspects of the operations of 1830 may be performed by a retransmission monitoring component as described with reference to FIGS. 9 through 12.

At 1835, the base station may retransmit the data packet to the UE based on the HARQ feedback. The operations of 1835 may be performed according to the methods described herein. In some examples, aspects of the operations of 1835 may be performed by a retransmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting, to a base station, a UE capability associated with reference signal reporting by the UE; receiving, from the base station, a data packet and an indication of a mode for the reference signal reporting based at least in part on the UE capability; determining that a slot includes first resources for transmitting an SRS and second resources for transmitting HARQ feedback for the data packet; and transmitting, to the base station during the slot and based at least in part on the indication of the mode for the reference signal reporting, the HARQ feedback and one or more of the SRS or CSI associated with the HARQ feedback.

Aspect 2: The method of aspect 1, further comprising: determining that the mode for the reference signal reporting configures the UE to transmit the HARQ feedback and the SRS, wherein transmitting the HARQ feedback and one or more of the SRS or the CSI associated with the HARQ feedback is based at least in part on the determining.

Aspect 3: The method of aspect 1, further comprising: determining that the mode for the reference signal reporting configures the UE to transmit the HARQ feedback and the CSI associated with the HARQ feedback, wherein transmitting the HARQ feedback and one or more of the SRS or the CSI associated with the HARQ feedback is based at least in part on the determining.

Aspect 4: The method of aspect 1, further comprising: determining that the mode for the reference signal reporting configures the UE to transmit the HARQ feedback, the CSI associated with the HARQ feedback, and the SRS, wherein transmitting the HARQ feedback and one or more of the SRS or the CSI associated with the HARQ feedback is based at least in part on the determining.

Aspect 5: The method of any of aspects 1 through 4, wherein receiving the indication of the mode for the reference signal reporting comprises: receiving RRC signaling, DCI, or a MAC CE comprising the indication of the mode for the reference signal reporting.

Aspect 6: The method of any of aspects 1 through 5, wherein transmitting the UE capability comprises: transmitting the UE capability via uplink control information, a MAC CE, or both.

Aspect 7: The method of any of aspects 1 through 6, further comprising: transmitting an updated UE capability based at least in part on a change to a power availability at the UE, a change to a processing capability at the UE, a change to one or more channel conditions, or any combination thereof, wherein the indication of the mode for the reference signal reporting is based at least in part on the updated UE capability.

Aspect 8: The method of any of aspects 1 through 7, wherein the UE capability for reference signal reporting is based at least in part on one or more of battery status, processing capability, modem capability, and channel conditions.

Aspect 9: The method of any of aspects 1 through 8, further comprising: receiving a second indication of an updated mode for the reference signal reporting from the base station, wherein transmitting the HARQ feedback and one or more of the SRS or the CSI associated with the HARQ feedback is based at least in part on the updated mode for the reference signal reporting.

Aspect 10: The method of any of aspects 1 through 9, further comprising: determining a plurality of component carriers are configured for the UE; and determining, based at least in part on the indication of the mode for the reference signal reporting, a corresponding mode for each component carrier of the plurality of component carriers, wherein transmitting the HARQ feedback and one or more of the SRS or the CSI associated with the HARQ feedback on each component carrier of the plurality of component carriers is based at least in part on the corresponding mode.

Aspect 11: The method of aspect 10, wherein a first mode corresponds to a first component carrier of the plurality of component carriers, and a second mode corresponds to a second component carrier of the plurality of component carriers, the first mode and the second mode are different.

Aspect 12: The method of any of aspects 1 through 11, further comprising: determining that the UE cannot meet a timeline for calculating the CSI associated with the HARQ feedback, wherein the transmitting comprises transmitting the HARQ feedback and the SRS based at least in part on determining that the UE cannot meet the timeline.

Aspect 13: The method of any of aspects 1 through 12, further comprising: monitoring for a retransmission of the data packet from the base station based at least in part on transmitting the HARQ feedback and one or more of the SRS or the CSI associated with the HARQ feedback.

Aspect 14: A method for wireless communications at a base station, comprising: receiving, from a UE, a UE capability associated with reference signal reporting by the UE; selecting a mode for the UE for the reference signal reporting based at least in part on the UE capability; transmitting, to the UE, a data packet and an indication of the mode for the reference signal reporting; scheduling the UE with first resources for HARQ feedback of the data packet in a slot including second resources for transmitting an SRS; and receiving, from the UE during the slot and based at least in part on the mode for the reference signal reporting, the HARQ feedback and one or more of the SRS or CSI associated with the HARQ feedback.

Aspect 15: The method of aspect 14, wherein selecting the mode for the UE for the reference signal reporting comprises: selecting the mode for the reference signal reporting to configure the UE to transmit the HARQ feedback and the SRS.

Aspect 16: The method of aspect 14, wherein selecting the mode for the UE for the reference signal reporting comprises: selecting the mode for the reference signal reporting to configure the UE to transmit the HARQ feedback and the CSI associated with the HARQ feedback.

Aspect 17: The method of aspect 14, wherein selecting the mode for the UE for the reference signal reporting comprises: selecting the mode for the reference signal reporting to configure the UE to transmit the HARQ feedback, the CSI associated with the HARQ feedback, and the SRS.

Aspect 18: The method of any of aspects 14 through 17, wherein transmitting the indication of the mode for the reference signal reporting comprises: transmitting RRC signaling, DCI, or a MAC CE comprising the indication of the mode for reference signal reporting.

Aspect 19: The method of any of aspects 14 through 18, wherein receiving the UE capability comprises: receiving the UE capability via uplink control information, a MAC CE, or both.

Aspect 20: The method of any of aspects 14 through 19, further comprising: receiving an updated UE capability based at least in part on a change to a power availability at the UE, a change to a processing capability at the UE, a change to one or more channel conditions, or any combination thereof, wherein selecting the mode for the reference signal reporting is based at least in part on the updated UE capability.

Aspect 21: The method of any of aspects 14 through 20, further comprising: determining a plurality of component carriers are configured for the UE, wherein selecting the mode for the UE for the reference signal reporting comprises selecting a corresponding mode for each component carrier of the plurality of component carriers, wherein the indication of the mode for the reference signal reporting indicates the corresponding mode for the reference signal reporting for each component carrier of the plurality of component carriers.

Aspect 22: The method of aspect 21, wherein the UE capability is based at least in part on channel conditions for each component carrier of the plurality of component carriers.

Aspect 23: The method of any of aspects 21 through 22, wherein a first mode corresponds to a first component carrier of the plurality of component carriers, and a second mode corresponds to a second component carrier of the plurality of component carriers, the first mode and the second mode are different.

Aspect 24: The method of any of aspects 14 through 23, further comprising: determining that the base station cannot process the SRS, wherein the mode for the reference signal reporting configures the UE to transmit the HARQ feedback and the CSI associated with the HARQ feedback based at least in part on the determining.

Aspect 25: The method of any of aspects 14 through 24, further comprising: retransmitting the data packet to the UE based at least in part on the HARQ feedback.

Aspect 26: The method of aspect 25, further comprising: determining a modulation and coding scheme for retransmitting the data packet, a resource for retransmitting the data packet, or both, based at least in part on receiving the CSI associated with the HARQ feedback, wherein retransmitting the data packet is based at least in part on determining the modulation and coding scheme for retransmitting the data packet, the resource for retransmitting the data packet, or both.

Aspect 27: The method of any of aspects 14 through 26, further comprising: determining a precoding beam for communications with the UE based at least in part on receiving the SRS.

Aspect 28: The method of any of aspects 14 through 27, further comprising: determining one or more of a precoding matrix index, a channel quality index, a channel rank, and a retransmission configuration based at least in part on receiving the SRS, wherein the mode for the reference signal reporting configures the UE to transmit the HARQ feedback and the SRS.

Aspect 29: An apparatus for wireless communications at a UE, comprising a processor; memory coupled with the processor; and instructions stored in the memory and executable by the processor to cause the apparatus to perform a method of any of aspects 1 through 13.

Aspect 30: An apparatus for wireless communications at a UE, comprising at least one means for performing a method of any of aspects 1 through 13.

Aspect 31: A non-transitory computer-readable medium storing code for wireless communications at a UE, the code comprising instructions executable by a processor to perform a method of any of aspects 1 through 13.

Aspect 32: An apparatus for wireless communications at a base station, comprising a processor; memory coupled with the processor; and instructions stored in the memory and executable by the processor to cause the apparatus to perform a method of any of aspects 14 through 28.

Aspect 33: An apparatus for wireless communications at a base station, comprising at least one means for performing a method of any of aspects 14 through 28.

Aspect 34: A non-transitory computer-readable medium storing code for wireless communications at a base station, the code comprising instructions executable by a processor to perform a method of any of aspects 14 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to a network device, a UE capability associated with reference signal reporting by the UE, wherein the UE capability is based at least in part on one or more of battery status, processing capability, modem capability, or channel conditions;

receiving, from the network device, a data packet and an indication of a mode for the reference signal reporting of a plurality of modes for the reference signal reporting, the plurality of modes for the reference signal reporting comprising a first mode associated with transmitting hybrid automatic repeat request feedback for the data packet with a sounding reference signal, a second mode comprising transmitting the hybrid automatic repeat request feedback with channel state information associated with the hybrid automatic repeat request feedback, and a third mode comprising transmitting the hybrid automatic repeat request feedback with both of the sounding reference signal and the channel state information, wherein the indication of the mode for the reference signal reporting indicates one of the first mode, the second mode, or the third mode based at least in part on the UE capability;

determining that a slot includes first resources for transmitting the sounding reference signal and second resources for transmitting the hybrid automatic repeat request feedback for the data packet; transmitting, to the network device during the slot and based at least in part on the indication of the mode for the reference signal reporting, the hybrid automatic repeat request feedback and one or more of the sounding reference signal or the channel state information associated with the hybrid automatic repeat request feedback;

determining a plurality of component carriers are configured for the UE; and determining, based at least in part on the indication of the mode for the reference signal reporting, a corresponding mode for each component carrier of the plurality of component carriers, wherein transmitting the hybrid automatic repeat request feedback and one or more of the sounding reference signal or the channel state information associated with the hybrid automatic repeat request feedback on each component carrier of the plurality of component carriers is based at least in part on the corresponding mode.

2. The method of claim 1, further comprising:
determining that the mode for the reference signal reporting configures the UE to transmit the hybrid automatic repeat request feedback and the sounding reference signal, wherein transmitting the hybrid automatic repeat request feedback and one or more of the sounding reference signal or the channel state information associated with the hybrid automatic repeat request feedback is based at least in part on the determining.

3. The method of claim 1, further comprising:
determining that the mode for the reference signal reporting configures the UE to transmit the hybrid automatic repeat request feedback and the channel state information associated with the hybrid automatic repeat request feedback, wherein transmitting the hybrid automatic repeat request feedback and one or more of the sounding reference signal or the channel state information associated with the hybrid automatic repeat request feedback is based at least in part on the determining.

4. The method of claim 1, further comprising:
determining that the mode for the reference signal reporting configures the UE to transmit the hybrid automatic repeat request feedback, the channel state information associated with the hybrid automatic repeat request feedback, and the sounding reference signal, wherein transmitting the hybrid automatic repeat request feedback and one or more of the sounding reference signal or the channel state information associated with the hybrid automatic repeat request feedback is based at least in part on the determining.

5. The method of claim 1, wherein receiving the indication of the mode for the reference signal reporting comprises:
receiving radio resource control signaling, downlink control information, or a medium access control (MAC) control element (CE) comprising the indication of the mode for the reference signal reporting.

6. The method of claim 1, wherein transmitting the UE capability comprises:
transmitting the UE capability via uplink control information, a medium access control (MAC) control element (CE), or both.

7. The method of claim 1, further comprising:
transmitting an updated UE capability based at least in part on a change to a power availability at the UE, a change to a processing capability at the UE, a change to one or more channel conditions, or any combination thereof, wherein the indication of the mode for the reference signal reporting is based at least in part on the updated UE capability.

8. The method of claim 1, further comprising:
receiving a second indication of an updated mode for the reference signal reporting from the network device, wherein transmitting the hybrid automatic repeat request feedback and one or more of the sounding reference signal or the channel state information associated with the hybrid automatic repeat request feedback is based at least in part on the updated mode for the reference signal reporting.

9. The method of claim 1, wherein the first mode corresponds to a first component carrier of the plurality of component carriers, and the second mode corresponds to a second component carrier of the plurality of component carriers, wherein the first mode and the second mode are different.

10. A method for wireless communications at a user equipment (UE), comprising:
transmitting, to a network device, a UE capability associated with reference signal reporting by the UE, wherein the UE capability is based at least in part on one or more of battery status, processing capability, modem capability, or channel conditions;

receiving, from the network device, a data packet and an indication of a mode for the reference signal reporting of a plurality of modes for the reference signal reporting, the plurality of modes for the reference signal reporting comprising a first mode associated with transmitting hybrid automatic repeat request feedback for the data packet with a sounding reference signal, a second mode comprising transmitting the hybrid automatic repeat request feedback with channel state information associated with the hybrid automatic repeat request feedback, and a third mode comprising transmitting the hybrid automatic repeat request feedback with both of the sounding reference signal and the channel state information, wherein the indication of the mode for the reference signal reporting indicates one of the first mode, the second mode, or the third mode based at least in part on the UE capability;

determining that a slot includes first resources for transmitting the sounding reference signal and second resources for transmitting the hybrid automatic repeat request feedback for the data packet;

transmitting, to the network device during the slot and based at least in part on the indication of the mode for the reference signal reporting, the hybrid automatic repeat request feedback and one or more of the sounding reference signal or the channel state information associated with the hybrid automatic repeat request feedback; and determining that the UE cannot meet a timeline for calculating the channel state information associated with the hybrid automatic repeat request feedback, wherein the transmitting comprises transmitting the hybrid automatic repeat request feedback and the sounding reference signal based at least in part on determining that the UE cannot meet the timeline.

11. The method of claim 1, further comprising:

monitoring for a retransmission of the data packet from the network device based at least in part on transmitting the hybrid automatic repeat request feedback and one or more of the sounding reference signal or the channel state information associated with the hybrid automatic repeat request feedback.

12. A method for wireless communications at a network device, comprising:

receiving, from a user equipment (UE), a UE capability associated with reference signal reporting by the UE, wherein the UE capability is based at least in part on one or more of battery status, processing capability, modem capability, or channel conditions;

selecting, for the UE, a mode for the reference signal reporting of a plurality of modes for the reference signal reporting, the plurality of modes for the reference signal reporting comprising a first mode associated with transmitting hybrid automatic repeat request feedback for a data packet with a sounding reference signal, a second mode comprising transmitting the hybrid automatic repeat request feedback with channel state information associated with the hybrid automatic repeat request feedback, and a third mode comprising transmitting the hybrid automatic repeat request feedback with both of the sounding reference signal and the channel state information, wherein the mode for the reference signal reporting is selected based at least in part on the UE capability;

transmitting, to the UE, the data packet and an indication of the mode for the reference signal reporting, wherein the indication of the mode for the reference signal reporting indicates one of the first mode, the second mode, or the third mode;

scheduling the UE with first resources for hybrid automatic repeat request feedback of the data packet in a slot including second resources for transmitting the sounding reference signal; receiving, from the UE during the slot and based at least in part on the mode for the reference signal reporting, the hybrid automatic repeat request feedback and one or more of the sounding reference signal or the channel state information associated with the hybrid automatic repeat request feedback; and determining a plurality of component carriers are configured for the UE, wherein selecting the mode for the UE for the reference signal reporting comprises selecting a corresponding mode for each component carrier of the plurality of component carriers, wherein the indication of the mode for the reference signal reporting indicates the corresponding mode for the reference signal reporting for each component carrier of the plurality of component carriers.

13. The method of claim 12, wherein selecting the mode for the UE for the reference signal reporting comprises:

selecting the mode for the reference signal reporting to configure the UE to transmit the hybrid automatic repeat request feedback and the sounding reference signal.

14. The method of claim 12, wherein selecting the mode for the UE for the reference signal reporting comprises:

selecting the mode for the reference signal reporting to configure the UE to transmit the hybrid automatic repeat request feedback and the channel state information associated with the hybrid automatic repeat request feedback.

15. The method of claim 12, wherein selecting the mode for the UE for the reference signal reporting comprises:

selecting the mode for the reference signal reporting to configure the UE to transmit the hybrid automatic repeat request feedback, the channel state information associated with the hybrid automatic repeat request feedback, and the sounding reference signal.

16. The method of claim 12, wherein transmitting the indication of the mode for the reference signal reporting comprises:

transmitting radio resource control signaling, downlink control information, or a medium access control (MAC) control element (CE) comprising the indication of the mode for reference signal reporting.

17. The method of claim 14, wherein receiving the UE capability comprises:

receiving the UE capability via uplink control information, a medium access control (MAC) control element (CE), or both.

18. The method of claim 12, further comprising:

receiving an updated UE capability based at least in part on a change to a power availability at the UE, a change to a processing capability at the UE, a change to one or more channel conditions, or any combination thereof, wherein selecting the mode for the reference signal reporting is based at least in part on the updated UE capability.

19. The method of claim 12, wherein the UE capability is based at least in part on channel conditions for each component carrier of the plurality of component carriers.

20. The method of claim 12, wherein the first mode corresponds to a first component carrier of the plurality of component carriers, and the second mode corresponds to a second component carrier of the plurality of component carriers, wherein the first mode and the second mode are different.

21. The method of claim 12, further comprising:

determining that the network device cannot process the sounding reference signal, wherein the mode for the reference signal reporting configures the UE to transmit the hybrid automatic repeat request feedback and the channel state information associated with the hybrid automatic repeat request feedback based at least in part on the determining.

22. The method of claim 12, further comprising:

retransmitting the data packet to the UE based at least in part on the hybrid automatic repeat request feedback.

23. The method of claim 22, further comprising:

determining a modulation and coding scheme for retransmitting the data packet, a resource for retransmitting the data packet, or both, based at least in part on receiving the channel state information associated with the hybrid automatic repeat request feedback, wherein retransmitting the data packet is based at least in part on determining the modulation and coding scheme for retransmitting the data packet, the resource for retransmitting the data packet, or both.

24. The method of claim 12, further comprising:
determining a precoding beam for communications with the UE based at least in part on receiving the sounding reference signal.

25. The method of claim 12, further comprising:
determining one or more of a precoding matrix index, a channel quality index, a channel rank, and a retransmission configuration based at least in part on receiving the sounding reference signal, wherein the mode for the reference signal reporting configures the UE to transmit the hybrid automatic repeat request feedback and the sounding reference signal.

26. An apparatus for wireless communications at a user equipment (UE), comprising:
one or more memories storing processor-executable code; and
one or more processors coupled with the one or more memories and individually or collectively operable to execute the code to cause the apparatus to:
transmit, to a network device, a UE capability associated with reference signal reporting by the UE, wherein the UE capability is based at least in part on one or more of battery status, processing capability, modem capability, or channel conditions;
receive, from the network device, a data packet and an indication of a mode for the reference signal reporting of a plurality of modes for the reference signal reporting, the plurality of modes for the reference signal reporting comprising a first mode associated with transmitting hybrid automatic repeat request feedback for the data packet with a sounding reference signal, a second mode comprising transmitting the hybrid automatic repeat request feedback with channel state information associated with the hybrid automatic repeat request feedback, and a third mode comprising transmitting the hybrid automatic repeat request feedback with both of the sounding reference signal and the channel state information, wherein the mode for the reference signal reporting is based at least in part on the UE capability;
determine that a slot includes first resources for transmitting the sounding reference signal and second resources for transmitting hybrid automatic repeat request feedback for the data packet; transmit, to the network device during the slot and based at least in part on the indication of the mode for the reference signal reporting, the hybrid automatic repeat request feedback and one or more of the sounding reference signal or the channel state information associated with the hybrid automatic repeat request feedback;
determining a plurality of component carriers are configured for the UE; and
determining, based at least in part on the indication of the mode for the reference signal reporting, a corresponding mode for each component carrier of the plurality of component carriers, wherein transmitting the hybrid automatic repeat request feedback and one or more of the sounding reference signal or the channel state information associated with the hybrid automatic repeat request feedback on each component carrier of the plurality of component carriers is based at least in part on the corresponding mode.

27. An apparatus for wireless communications at a network device, comprising:
one or more memories storing processor-executable code; and
one or more processors coupled with the one or more memories and individually or collectively operable to execute the code to cause the apparatus to:
receive, from a user equipment (UE), a UE capability associated with reference signal reporting by the UE, wherein the UE capability is based at least in part on one or more of battery status, processing capability, modem capability, or channel conditions;
select, for the UE, a mode for the reference signal reporting of a plurality of modes for the reference signal reporting, the plurality of modes for the reference signal reporting comprising a first mode associated with transmitting hybrid automatic repeat request feedback for a data packet with a sounding reference signal, a second mode comprising transmitting the hybrid automatic repeat request feedback with channel state information associated with the hybrid automatic repeat request feedback, and a third mode comprising transmitting the hybrid automatic repeat request feedback with both of the sounding reference signal and the channel state information, wherein the mode for the reference signal reporting is selected based at least in part on the UE capability;
transmit, to the UE, the data packet and an indication of the mode for the reference signal reporting, wherein the indication of the mode for the reference signal reporting indicates one of the first mode, the second mode, or the third mode;
schedule the UE with first resources for hybrid automatic repeat request feedback of the data packet in a slot including second resources for transmitting the sounding reference signal;
receive, from the UE during the slot and based at least in part on the mode for the reference signal reporting, the hybrid automatic repeat request feedback and one or more of the sounding reference signal or the channel state information associated with the hybrid automatic repeat request feedback; and
determining a plurality of component carriers are configured for the UE, wherein selecting the mode for the UE for the reference signal reporting comprises selecting a corresponding mode for each component carrier of the plurality of component carriers, wherein the indication of the mode for the reference signal reporting indicates the corresponding mode for the reference signal reporting for each component carrier of the plurality of component carriers.

* * * * *